United States Patent
Piro, Jr.

(10) Patent No.: US 9,398,434 B2
(45) Date of Patent: Jul. 19, 2016

(54) METHOD AND SYSTEM FOR ZONE ANALYSIS IN A CHARGING SYSTEM

(71) Applicant: Oracle International Corporation, Redwood Shores, CA (US)

(72) Inventor: Louis Thomas Piro, Jr., San Jose, CA (US)

(73) Assignee: Oracle International Corporation, Redwood Shores, CA (US)

(*) Notice: Subject to any disclaimer, the term of this patent is extended or adjusted under 35 U.S.C. 154(b) by 0 days.

(21) Appl. No.: 14/490,051

(22) Filed: Sep. 18, 2014

(65) Prior Publication Data

US 2015/0148004 A1     May 28, 2015

Related U.S. Application Data

(60) Provisional application No. 61/908,602, filed on Nov. 25, 2013.

(51) Int. Cl.
    *H04W 4/24*     (2009.01)
    *H04L 12/14*     (2006.01)
    *H04M 15/00*     (2006.01)

(52) U.S. Cl.
    CPC ............. *H04W 4/24* (2013.01); *H04L 12/1403* (2013.01); *H04L 12/1425* (2013.01); *H04M 15/43* (2013.01); *H04M 15/61* (2013.01);
(Continued)

(58) Field of Classification Search
    CPC . H04W 4/24; H04L 12/1432; H04L 12/1407; H04L 12/1403; H04L 12/1425; H04M 15/8033; H04M 15/61; H04M 15/8011; H04M 15/80; H04M 15/43

USPC .............. 455/406, 67.11, 432.1, 515, 422.1, 455/426.1, 433, 405, 417; 705/5, 32, 335, 705/400; 370/338
See application file for complete search history.

(56) References Cited

U.S. PATENT DOCUMENTS

| | | | |
|---|---|---|---|
| 6,295,447 B1 * | 9/2001 | Reichelt et al. ......... | H04M 3/42 455/406 |
| 8,411,831 B2 * | 4/2013 | Thompson ............ | H04M 15/06 379/112.06 |
| 2009/0207994 A1 * | 8/2009 | Bruce et al. ............. | H04M 3/51 379/221.13 |

(Continued)

OTHER PUBLICATIONS

"Overview of 3GPP Release 99, Summary of all Release 99 Features," ETSI Mobile Competence Centre, 2004.
(Continued)

*Primary Examiner* — Dhaval Patel
(74) *Attorney, Agent, or Firm* — Jenkins, Wilson, Taylor & Hunt, P.A.

(57) ABSTRACT

The present disclosure described a method, non-transitory computer readable storage medium, and computer system that implement zone analysis in a charging system. Accordingly, the method, non-transitory computer readable storage medium, and computer system provide for receiving a service usage request, where the service usage request represents, at least in part, a request for service usage received from a subscriber and comprises a value pair, which, in turn, comprises a first value and a second value; identifying a zone item by traversing a configurable zone model tree, where the traversing is performed using the first value and the second value; and returning a zone name of the zone, where the zone item comprises the zone name, and the zone name identifies a charging structure to be used in satisfying the service usage request.

20 Claims, 22 Drawing Sheets

(52) U.S. Cl.
CPC ......... *H04M 15/80* (2013.01); *H04M 15/8011* (2013.01); *H04M 15/8033* (2013.01)

(56) References Cited

U.S. PATENT DOCUMENTS

2013/0212065 A1* 8/2013 Rahnama .......... G06F 17/30002 707/609

2013/0282626 A1* 10/2013 White et al. ....... G06Q 30/0201 706/11

OTHER PUBLICATIONS

"Overview of 3GPP Release 11 V0.2.0 (Sep. 2014)," ETSI Mobile Competence Centre, 2014.
"ANSI T1.107-200x," Digital Hierarchy—Formats Specifications, American National Standard for Telecommunications, 2001.

\* cited by examiner

| Zone Item 300 | | | | | | |
|---|---|---|---|---|---|---|
| Origin Prefix Code 310 | Destination Prefix Code 320 | Product Name 330 | Start Time 340 | End Time 345 | Zone Name 350 | Alternate Zone Model 355 |

*Fig. 3A*

BAY_AREA Zone Model 510

| | Origin Code 310 | Destination Code 320 | Product 330 | Zone Name 350 |
|---|---|---|---|---|
| Zone Item 515(1) | 408 | 408 | VOICE | Local-SJ |
| Zone Item 515(2) | 415 | 415 | VOICE | Local-SF-1 |
| Zone Item 515(3) | 415 | 415 | VOIP | Local-SF-2 |
| Zone Item 515(4) | 510 | 510 | VOICE | Local-OAK |
| Zone Item 515(5) | abc | xyz | DATA | SHORT |
| Zone Item 515(6) | ab | xy | DATA | MED |
| Zone Item 515(7) | a | x | DATA | LONG |
| Zone Item 515(8) | a | xyz | DATA | ALPHA |
| | | ... | | |
| Zone Item 515(N) | abc | x | DATA | GAMMA |

*Fig. 5A*

BAY_AREA Zone Model 520

| | Origin Prefix 310 | Dest Prefix 320 | Product 330 | Start Time 340 | End Time 345 | Zone Name 350 |
|---|---|---|---|---|---|---|
| Zone Item 525(1) | 408 | 408 | VOICE | 2012-01-01T00:00:00 | 2012-06-30T11:59:59 | Local-SJ |
| Zone Item 525(2) | 408 | 408 | VOICE | 2012-07-01T00:00:00 | 2099-01-01T00:00:00 | Local |
| Zone Item 525(3) | 415 | 415 | VOICE | 2012-01-01T00:00:00 | 2012-07-31T11:59:59 | Local-SF |
| Zone Item 525(4) | 415 | 415 | VOICE | 2012-08-01T00:00:00 | 2099-01-01T00:00:00 | Local |
| Zone Item 525(5) | 510 | 510 | VOICE | 2012-01-01T00:00:00 | 2012-08-30T11:59:59 | Local-OAK |
| Zone Item 525(6) | 510 | 510 | VOICE | 2012-09-01T00:00:00 | 2099-01-01T00:00:00 | Local |
| Zone Item 525(7) | abc | xyz | DATA | 2012-01-01T00:00:00 | 2012-06-30T11:59:59 | SHORT |
| Zone Item 525(8) | abc | xyz | DATA | 2012-07-01T00:00:00 | 2099-01-01T00:00:00 | S |
| Zone Item 525(9) | ab | xy | DATA | 2012-01-01T00:00:00 | 2012-07-31T11:59:59 | MED |
| Zone Item 525(10) | ab | xy | DATA | 2012-08-01T00:00:00 | 2099-01-01T00:00:00 | M |
| Zone Item 525(11) | a | x | DATA | 2012-01-01T00:00:00 | 2012-08-30T11:59:59 | LONG |
| Zone Item 525(12) | a | x | DATA | 2012-09-01T00:00:00 | 2099-01-01T00:00:00 | L |
| Zone Item 525(13) | a | xyz | DATA | 2012-01-01T00:00:00 | 2012-09-30T11:59:59 | ALPHA |
| Zone Item 525(14) | a | xyz | DATA | 2012-10-01T00:00:00 | 2099-01-01T00:00:00 | A |
| Zone Item 525(15) | abc | x | DATA | 2012-01-01T00:00:00 | 2012-10-31T11:59:59 | GAMMA |
| Zone Item 525(N) | abc | x | DATA | 2012-11-01T00:00:00 | 2099-01-01T00:00:00 | G |

*Fig. 5B*

BAY_AREA Zone Model 530

| | Product Name 330 | Origin Prefix Code 310 | Destination Prefix Code 320 | Zone Name 350 | Alternate Zone Model 355 |
|---|---|---|---|---|---|
| Zone Item 535(1) | VOICE | 408 | 408 | Local-SJ | |
| Zone Item 535(2) | VOICE | 408 | 01139 | International | ITALY |

ITALY Zone Model 540

| | Product Name 330 | Origin Prefix Code 310 | Destination Prefix Code 320 | Zone Name 350 | Alternate Zone Model 355 |
|---|---|---|---|---|---|
| Zone Item 545(1) | VOICE | 408 | 0113909 | ITALY | SICILY |
| Zone Item 545(2) | VOICE | 408 | 0113906 | ROME | |

SICILY Zone Model 550

| | Product Name 330 | Origin Prefix Code 310 | Destination Prefix Code 320 | Zone Name 350 | Alternate Zone Model 355 |
|---|---|---|---|---|---|
| Zone Item 555(1) | VOICE | 408 | 01139091 | PALERMO | |
| Zone Item 555(2) | VOICE | 408 | 01139090 | MESSINA | |
| Zone Item 555(3) | VOICE | 408 | 011390931 | SYRACUSE | |

*Fig. 5C*

BAY_AREA Zone Model Tree
640

| | Message Origin 710 | Message Destination 720 | Message Product 730 |
|---|---|---|---|
| Zone Lookup Request 715(1) | 408-111-1111 | 408-867-5309 | VOICE |
| Zone Lookup Request 715(2) | 415-222-2222 | 415-867-5309 | VOICE |
| Zone Lookup Request 715(3) | 510-333-3333 | 510-867-5309 | VOICE |
| Zone Lookup Request 715(4) | 777-777-7777 | 888-888-8888 | VOICE |
| Zone Lookup Request 715(5) | abcdefg | x | DATA |
| Zone Lookup Request 715(6) | abcdefg | xy | DATA |
| Zone Lookup Request 715(7) | a | x | DATA |
| Zone Lookup Request 715(8) | a | xyzxff | DATA |
| Zone Lookup Request 715(N) | abcdefg | xyz | DATA |

| | Zone Name 705 |
|---|---|
| Zone Result 750(1) | Local-SJ |
| Zone Result 750(2) | Local-SF-1 |
| Zone Result 750(3) | Local-OAK |
| Zone Result 750(4) | OUT_OF_AREA |
| Zone Result 750(5) | GAMMA |
| Zone Result 750(6) | MED |
| Zone Result 750(7) | LONG |
| Zone Result 750(8) | ALPHA |
| Zone Result 750(N) | SHORT |

*Fig. 7A*

| | Message Origin 710 | Message Destination 720 | Message Product 730 | Message Timestamp 740 |
|---|---|---|---|---|
| Request 725(1) | 408-111-1111 | 408-333-3333 | VOICE | 2012-01-01T00:00:00 |
| Request 725(2) | 408-111-1111 | 408-333-3333 | VOICE | 2012-06-30T11:59:59 |
| Request 725(3) | 408-111-1111 | 408-333-3333 | VOICE | 2012-07-01T00:00:00 |
| Request 725(4) | 415-222-2222 | 415-333-3333 | VOICE | 2012-01-01T00:00:00 |
| Request 725(5) | 415-222-2222 | 415-333-3333 | VOICE | 2012-07-31T11:59:59 |
| Request 725(6) | 415-222-2222 | 415-333-3333 | VOICE | 2012-08-01T00:00:00 |
| Request 725(7) | 777-777-7777 | 888-888-8888 | VOICE | 2012-01-01T00:00:00 |
| Request 725(8) | abcdefg | x | DATA | 2012-01-01T00:00:00 |
| Request 725(9) | abcdefg | x | DATA | 2012-10-31T11:59:59 |
| Request 725(10) | abcdefg | xlmnop | DATA | 2012-11-01T00:00:00 |
| Request 725(11) | a | x | DATA | 2012-08-30T11:59:59 |
| Request 725(12) | almnop | xqrst | DATA | 2012-09-01T00:00:00 |

| | Zone Name 705 |
|---|---|
| Zone Result 755(1) | Local-SJ |
| Zone Result 755(2) | Local-SJ |
| Zone Result 755(3) | Local |
| Zone Result 755(4) | Local-SF |
| Zone Result 755(5) | Local-SF |
| Zone Result 755(6) | Local |
| Zone Result 755(7) | OUT_OF_AREA |
| Zone Result 755(8) | GAMMA |
| Zone Result 755(9) | GAMMA |
| Zone Result 755(10) | G |
| Zone Result 755(11) | LONG |
| Zone Result 755(12) | L |

*Fig. 7B*

| | Message Origin 710 | Message Destination 720 | Message Product 730 |
|---|---|---|---|
| Zone Lookup Request 735(1) | 408-111-1111 | 408-333-3333 | VOICE |
| Zone Lookup Request 735(2) | 408-111-1111 | 011394444 | VOICE |
| Zone Lookup Request 735(3) | 408-111-1111 | 01139063333 | VOICE |
| Zone Lookup Request 735(4) | 415-222-2222 | 01139091444 | VOICE |
| Zone Lookup Request 735(5) | 415-222-2222 | 01139090555 | VOICE |
| Zone Lookup Request 735(6) | 415-222-2222 | 0113909316666 | VOICE |
| Zone Lookup Request 735(7) | 415-222-2222 | 01139097777 | VOICE |
| Zone Lookup Request 735(8) | 777-777-7777 | 888-888-8888 | VOICE |

| | Zone Name 705 |
|---|---|
| Zone Result 760(1) | Local-SJ |
| Zone Result 760(2) | International |
| Zone Result 760(3) | ROME |
| Zone Result 760(4) | PALERMO |
| Zone Result 760(5) | MESSINA |
| Zone Result 760(6) | SYRACUSE |
| Zone Result 760(6) | ITALY |
| Zone Result 760(7) | OUT_OF_AREA |

*Fig. 7C*

METHOD AND SYSTEM FOR ZONE ANALYSIS IN A CHARGING SYSTEM

CROSS-REFERENCE TO RELATED APPLICATIONS

The present patent application claims priority to Provisional Patent Application Ser. No. 61/908,602, filed Nov. 25, 2013, and entitled "Optimized Zone Analysis for Charging," which is hereby incorporated by reference herein, in its entirety and for all purposes.

FIELD OF THE INVENTION

The present disclosure relates to charging domains, and more particularly, to zone charging in a charging domain.

BACKGROUND OF THE INVENTION

Service providers are experiencing ever-growing service usage by subscribers. A service provider implements a charging system in which subscribers are charged for their service usage. An example charging system may implement a policy and charging control solution, such as that developed under 3GPP™ (3rd Generation Partnership Project) IMS (Internet Protocol Multimedia Subsystems) and provides a new standard for charging system business models.

BRIEF DESCRIPTION OF THE DRAWINGS

The present invention may be better understood, and its numerous objects, features and advantages made apparent to those skilled in the art by referencing the accompanying drawings.

FIG. 3A is a simplified block diagram illustrating an example zone item format, according to one embodiment.

FIGS. 5A, 5B, and 5C are simplified block diagrams illustrating components of example zone models, according to one embodiment.

FIGS. 7A, 7B, and 7C are simplified block diagrams illustrating components of example zone model analyses, according to one embodiment.

Figure 1:
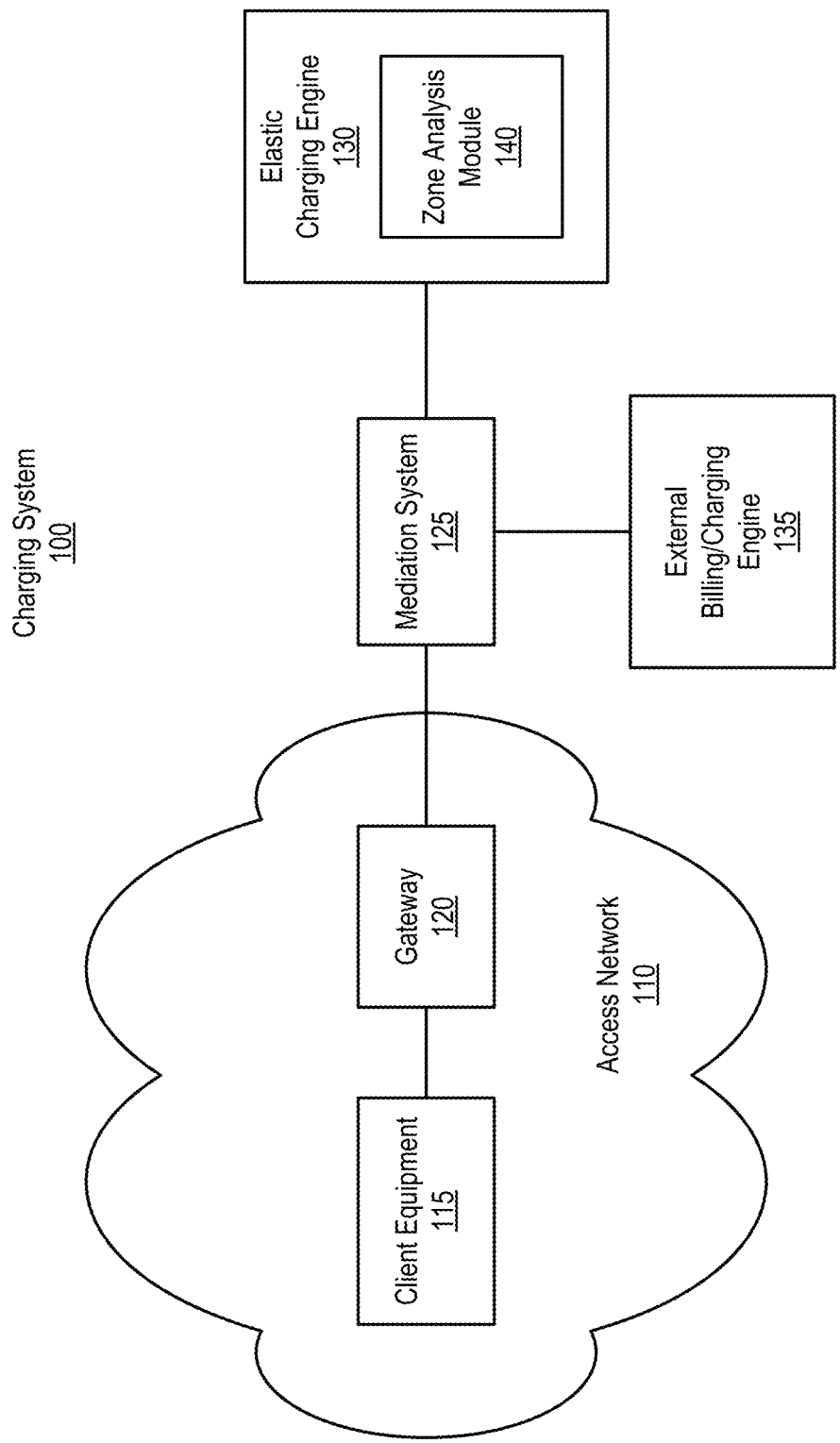
FIG. 1 is a simplified block diagram illustrating components of an example charging system in which the present disclosure can be implemented, according to one embodiment.

While the present disclosure is susceptible to various modifications and alternative forms, specific embodiments of the present disclosure are provided as examples in the drawings and detailed description. It should be understood that the drawings and detailed description are not intended to limit the present disclosure to the particular form disclosed. Instead, the intention is to cover all modifications, equivalents, and alternatives falling within the spirit and scope of the present disclosure as defined by the appended claims.

DETAILED DESCRIPTION

Overview

The present disclosure provides a method, non-transitory computer-readable storage medium, and apparatus that implement a configurable zone model tree structure that employs a combination of tree nodes and hash maps to facilitate storage of and searching for a charging zone (or more simply, "zone") that identifies one or more charging structures (e.g., a charging plan, rate structure, product/service rates, and/or the like) that are to be used to charge a subscriber for service usage of a service that the subscriber requests to use. Such a zone is identified by a combination of values, such as some manner of value pairs (e.g., origin and destination prefix code combinations), which allow for the identification of a zone that can then be used in charging a subscriber for the service(s) to be rendered in satisfying the service usage request (e.g., the services requested by the subscriber in making the service usage request). Further, such a service usage request can include attribute information that facilitates the identification of the appropriate zone for the requested service.

Example Embodiments

FIG. 1 is a simplified block diagram illustrating components of an example charging system 100 in which systems according to the present disclosure can be implemented. A service provider (such as a telecommunication service provider, a shipping service provider, a utility service provider, or the like) provides subscribers with access to one or more service products. A service provider can implement a charging system 100 that is configured to define and enforce conditions that indicate how subscribers should be charged for service usage. As illustrated, charging system 100 includes an access network 110, a mediation system 125, an elastic charging engine 130, and/or an external billing/charging engine 135. Access network 110 includes one or more user equipment 115 and one or more gateways 120. Each component is discussed below.

User equipment 115 is a computing device of a subscriber (or a user of a service). Examples of user equipment 115 include a computing device (e.g., a mobile phone, a smart phone, a tablet computer, a laptop computer), a terminal, a kiosk, and like devices that are utilized to access a service. Computing devices are further discussed below in connection with FIG. 11. User equipment 115 is configured to communicate with mediation system 125 via gateway 120 in access network 110. Examples of access network 110 include an IP (Internet Protocol) network, a telecommunications network, or other network that provides a subscriber with connectivity to mediation system 125. Examples of gateway 120 include a computing device, such as a server or switch device that is communicatively coupled to mediation system 125. Although only a single user equipment 115 and gateway 120 are illustrated in FIG. 1, more than one user equipment 115 and gateway 120 can be implemented in access network 110.

Elastic charging engine 130 is configured to perform certain calculations related to service usage (e.g., the calculation of one or more charges that arise from a subscriber's service usage). Elastic charging engine 130 can be implemented on one or more processing nodes, where the one or more processing nodes are implemented using one or more servers (such as on a high-availability cluster of grid-based servers), and where a server can be implemented using one or more computing devices. In certain embodiments, elastic charging engine 130 includes one or more charging components, each of which is responsible for performing a portion of the calculations needed to charge the subscriber for service usage. The charging components of elastic charging engine 130 can be implemented on the one or more processing nodes of elastic charging engine 130.

External billing/charging engine 135 may optionally be implemented in charging system 100. If implemented in charging system 100, external billing/charging engine 135 is distinct from elastic charging engine 130 and is configured to perform operations related to the billing of charges for subscribers and/or additional calculation of charges that arise from a subscriber's service usage. External billing engine/charging engine 135 can be implemented using one or more processing nodes (not shown), where the one or more processing nodes are implemented using one or more servers (such as on a grid-based high availability cluster of servers), and where a server can be implemented using one or more computing devices. External billing/charging engine 135 also includes one or more charging components (also not shown), each of which is responsible for performing a portion of the calculations needed to bill and/or additionally charge the subscriber for service usage. The charging components of external billing/charging engine 135 can be implemented using the one or more processing nodes of external billing/charging engine 135. Use of "charging engine" herein generally refers to a charging engine implemented in charging system 100, which includes charging engine 130 and external billing/charging engine 135.

Mediation system 125 can be implemented on one or more servers, where a server can be implemented on one or more computing devices. Mediation system 125 is communicatively coupled to both elastic charging engine 130 and external billing/charging engine 135. When a subscriber wishes to utilize a service, user equipment 115 of the subscriber is configured to send a service request to mediation system 125 via gateway 120. Mediation system 125 is configured to generate a corresponding charging request and route the charging request to the appropriate charging component of elastic charging engine 130 or external billing/charging engine 135. Each charging request includes a payload that contains information in the form of attributes about the subscriber's service usage, such as the type of service being utilized and service usage measurements (e.g., volume-, time-, or event-based service usage measurements). Elastic charging engine 130 and external billing/charging engine 135 are configured to utilize the payload to charge the subscriber.

As will be appreciated, different service providers may charge their respective subscribers differently, for example, in the situation in which a service provider's charging engine performs real-time charging operations for a subscriber's service usage based on location. A service provider can implement different charging rates for subscribers based on the location, or zone, in which the service usage takes place. For example, a subscriber who makes a phone call within a zone (e.g., a local call) may be charged at a rate lower than for a phone call made outside of the zone (e.g., a long distance call). A service provider can also implement different charging rates for subscribers based on the distance involved in the service usage. For example, a subscriber who ships a package within a 50-mile radius (e.g., local shipping) may be charged at a rate lower than shipping a package outside a 50-mile radius (e.g., out-of-town shipping).

While service providers could configure an extensive list of origin and destination prefix codes that result in special charges or discounts, doing so would be cumbersome and resource intensive. Such a list would include thousands of entries, likely more, each of which would need to be considered during real-time charging operations, in order to find a desired zone used to charge a subscriber. To find the desired zone, a charging engine using such a list would have to search through data structures in a linear fashion, and could not perform acceptably, particularly as the number of zone mapping entries reached ever-higher limits. As a result, usage request processing latencies would increase exponentially, as the number of zone entries grew. For example, with 10 origins and 10 destinations, 100 combinations thereof potentially exist (a number of combinations that might be manageable, save for the need to make such determinations quickly (e.g., within the relevant time constraints, such as the 50 ms, 230 ms, and 2 s constraints mandated to avoid Carrier Group Alarms (CGAs) in the case of voice telephone calls adhering to various relevant standards (e.g., including, but not limited to, 3GPP™ IMS (and more particularly, 3GPP™ (Phases 1 and 2, and Releases 96-99 and 4-11)), Bell Communications Research (Bellcore; now Telcordia) General Requirements and Industry Standards (GR) GR-499, Bellcore GR-253 (including GR-253: *Synchronous Optical Network (SONET) Transport Systems*, Common Generic Criteria, Issue 5 [Bellcore, October 2009]), and ANSI (American National Standards Institute) T1.102, and the timing requirements therein, all of which are included herein by reference, in their entirety and for all purposes); with 10 times that number of origins and destinations (i.e., 100 origins and 100 destinations), 10,000 potential combinations exist, a 100-fold increase. Thus, in the case of telephone area codes, the number of origins and destinations, along with the requirements of the relevant standards, quickly results in situations that even automated (e.g., computerized) alternative approaches becoming unworkable. These and other limitations and problems are addressed by systems according to the present disclosure.

Included in elastic charging engine 130 is a zone analysis module 140, which can be implemented according to concepts described in the present disclosure. Zone analysis module 140 initiates zone model analysis to obtain a zone result that can then be used in a subscriber's charging operations, in response to an incoming service usage request. The present disclosure provides a configurable zone model tree structure that implements a combination of tree nodes and hash maps to optimally search for origin and destination prefix code combinations, in order to efficiently and effectively provide information (e.g., one or more zone items) corresponding thereto. Such a configurable zone model tree structure can, for example, be traversed by performing a best-case partial match using an origin prefix code and a destination prefix code as keys, where each origin and destination prefix code combination identifies one or more zones that are candidates for use in a subscriber's charging operations. Each candidate zone is also associated with a service product and/or a validity range. A candidate zone that matches a specified service product and/or falls within the validity range is returned as the zone result and is used for charging operations.

Systems according to the present disclosure are able to produce a predictable latency that is a combination of searching through data structures that are both constant and logarithmic in seek time. The configurable zone model provides a flexible and generic approach, and is thus able to support many types of request prefix codes, such as postal codes, area codes, latitude and longitude, and the like. The configurable zone model also supports wild-card matching, allowing the desired information to be found quickly and efficiently. In certain embodiments, a zone model tree structure according to the present disclosure permits traversal of such a structure to the desired depth in an optimized fashion. Using such configurable zone models, systems according to the present disclosure allow service providers to fully implement support for zoning in their services, and to do so without negatively impacting overall charging request latencies, important factors in meeting strict real-time latency requirements. Zone analysis module 140 is discussed in further detail in connection with FIG. 2.

Mediation system 125 can be communicatively coupled to gateway 120, elastic charging engine 130, and/or external billing/charging engine 135 via, for example, one or more IP (Internet Protocol) networks that utilize a communications protocol such as Ethernet, IEEE 802.11x, or some other communications protocol. In light of the present disclosure, it will be appreciated that charging system 100 and access network 110 can include other components, such as base stations, access gateways, serving gateways, IP networks, servers, routers, switches, firewalls, and the like that are not germane to the discussion of the present disclosure and will not be discussed further herein. It will also be appreciated that other configurations are possible. For example, a large number of distinct user equipment devices and gateways can be implemented in access network 110. Also, charging system 100 may also include additional components not illustrated. Further, a repository and/or a data store discussed herein can be implemented using one or more storage devices (e.g., a single storage device or a collection of storage devices). A storage device can be implemented using network attached storage (NAS), file servers, storage filers, a storage area network (SAN), and the like.

The letter N is used to indicate a variable number of devices or components that are discussed herein. For example, a variable number of zone models 320(1)-(N) may each include a variable number of zone items 410(1)-(N). Although the letter N is used in describing a variable number of instances of each of these different devices and components herein, a repeated use of the letter N does not necessarily indicate that each device and component has a same number of N instances implemented in the system.

Figure 2:
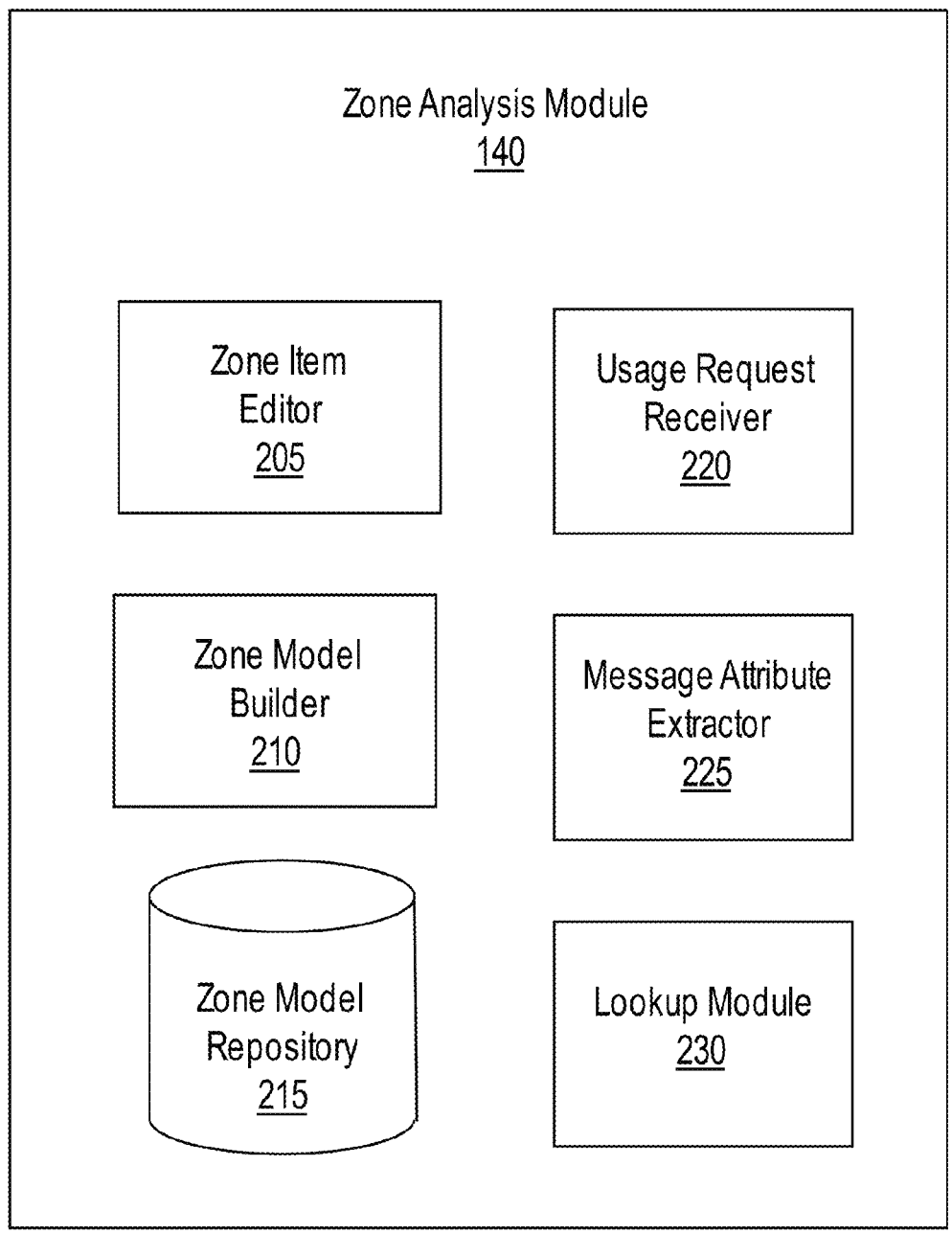
FIG. 2 is a simplified block diagram illustrating components of an example zone analysis module in which the present disclosure can be implemented, according to one embodiment.

FIG. 2 is a simplified block diagram illustrating components of an example zone analysis module in which the present disclosure can be implemented (and depicted in FIG. 2 as zone analysis module 140 from FIG. 1). Zone analysis module 140 includes a zone item editor 205, a zone model builder 210, a zone model repository 215, a usage request receiver 220, a message attribute extractor 225, and a lookup module 230. Components of zone analysis module 140 are implemented on one or more nodes of a charging engine. In one embodiment, zone item editor 205 and zone model builder 210 are located on a separate processing node that is coupled to the charging engine, where the separate node does not perform charging operations. Such an embodiment avoids slowing down (e.g., adding processing overhead to) charging operations performed by the charging engine due to zone model generation. Each of these components is discussed below.

Zone item editor 205 is configured to provide a user interface (e.g., a graphical user interface (GUI) or a text-based command line interface (CLI)) that is configured to display text entered (e.g., text typed on a keyboard or text selected from a GUI element, such as a drop down menu) by a user or administrator. An administrator utilizes zone item editor 205 to define one or more zone models that include one or more zone items. Zone items are further discussed below in connection with FIG. 3A and zone models are further discussed below in connection with FIG. 3B. Example zone models are discussed in greater detail in connection with FIGS. 5A, 5B, and 5C.

Zone model builder 210 is configured to incorporate the administrator-entered zone items into a zone model tree structure for each zone model. The charging engine uses the zone model tree during charging operations to determine a zone used to charge a subscriber. A zone model tree structure is a combination of tree nodes and hash maps used to optimally search for a zone. A source (or origin) prefix and a destination prefix are used as input to traverse the tree nodes and find a stored zone item that includes a resulting zone. Zone model builder 210 is configured to build or update a zone model tree, based on the entered zone items. Zone model trees are discussed in greater detail in connection with FIGS. 6A, 6B, and 6C.

Zone models are stored in zone model repository 215, which is a database or other organized collection of data located on a storage device. Zone models can be added to repository 215 while the charging engine is running (e.g., without stopping or restarting components of the charging engine) and are available for use in charging operations.

Usage request receiver 220 is coupled to one or more ports of the charging engine (e.g., one or more ports of a server or node on which the charging engine is implemented) that are also communicatively coupled to mediation system 125. Usage request receiver 220 is configured to receive an incoming message from mediation system 125. In one embodiment, the incoming message is a service request message that requests usage of a service. Usage request receiver 220 can also include a queue (e.g., a first-in, first-out (FIFO) queue) for holding incoming messages.

Message attribute extractor 225 is configured to extract attributes from a received usage request message, where the extracted attributes are used to perform a zone lookup request. Message attribute extractor 225 can also include a buffer for holding a received message (e.g., the next available message retrieved from the queue). Example attributes include an origin prefix code, a destination prefix code, a product name, and/or a time stamp. Message attributes extractor provides the extracted attributes to lookup module 230.

Lookup module 230 is configured to perform a zone lookup, in order to obtain a zone result that satisfies, at least in part, a zone lookup request. Lookup module 230 traverses the zone model tree structure by using the extracted origin prefix code and destination prefix code to perform a best-case partial match in the zone model tree structure, which identifies one or more candidate zones. Lookup module 230 selects a zone from the one or more candidate zones, using, for example, the extracted product, time stamp, and/or other such information, and returns the selected zone as the zone result. Zone lookup requests and zone results are further discussed in greater detail in connection with FIGS. 7A, 7B, and 7C.

FIG. 3A is a simplified block diagram illustrating an example zone item format. A zone item 300 includes an origin prefix code 310, a destination prefix code 320, a product name 330, a start time 340 (optional), an end time 345 (optional), and a zone name 350. Each zone item entry optionally includes a validity period defined by start time 340 and end time 345, and/or an alternate zone model 355. Each of these components is discussed in greater detail below.

Origin prefix code 310 identifies an origin area from which a subscriber's service usage originates. Destination prefix code 320 identifies a destination area to which the service usage is destined. Origin areas and destination areas are typically geographic areas, but can be more conceptual in nature (e.g., virtual (logical) groupings of users). Example prefix codes include, but are not limited to, area codes, zip codes, and other alphanumerical character sequences that identify (typically, uniquely) a geographic (or conceptual) area.

Product name 330 identifies a service product associated with the service usage. Example service products include, but are not limited to, voice (e.g., phone calls), VOIP (voice over Internet Protocol), data (e.g., data transfer), and the like.

Start time 340 and end time 345 are indications of time, such as a time stamp or a value indicating a time, such as a value of "immediately" and "never ends," respectively. Start time 340 and end time 345 define a validity period, or a period of time during which the associated zone (or zone name 350) is valid (and thus active) and can be returned as a zone result (which is used to charge a subscriber). The validity period can be used to make an associated zone "versionable"—various zones become active (valid) or expire (become inactive (invalid)) at different times in order to implement different product rates during different time periods. Further in this regard, it will be appreciated that, while the zone items discussed herein are described in terms of being single entries, such zone items can, in fact, be implemented as tables of zone items, each with multiple entries identified with different criteria that can be accessed using various attributes from a given service usage request. It will also be appreciated that such constructs are merely examples of the many such constructs that can be used to implement zone items according to the present disclosure, as will be apparent in view of the present disclosure.

Zone name 350 identifies a zone that is associated with a charging plan and/or product rates that are used to charge a subscriber for service usage. A zone is associated with a combination of origin prefix code, a destination prefix code, a product, and (optionally) a time stamp. Among other possibilities, a standard zone is determined based on the associated origin prefix code and destination prefix code, while a geographic zone is determined based on the distance between the associated origin prefix code and destination prefix code.

Alternate zone model 355 is an identifier that identifies another zone model. The presence of alternate zone model 355 in zone item 300 redirects from the present zone model to another distinct zone model. Alternate zone model 355 is thus used to identify a nested zone model, where the traversing continues on the nested zone model. Alternate zone models enable an administrator to define more granular zone rules (also referred to a zone items) and reuse those zone rules in multiple zone models. Alternate zone models are discussed in greater detail in connection with FIG. 6C.

Figure 3B:
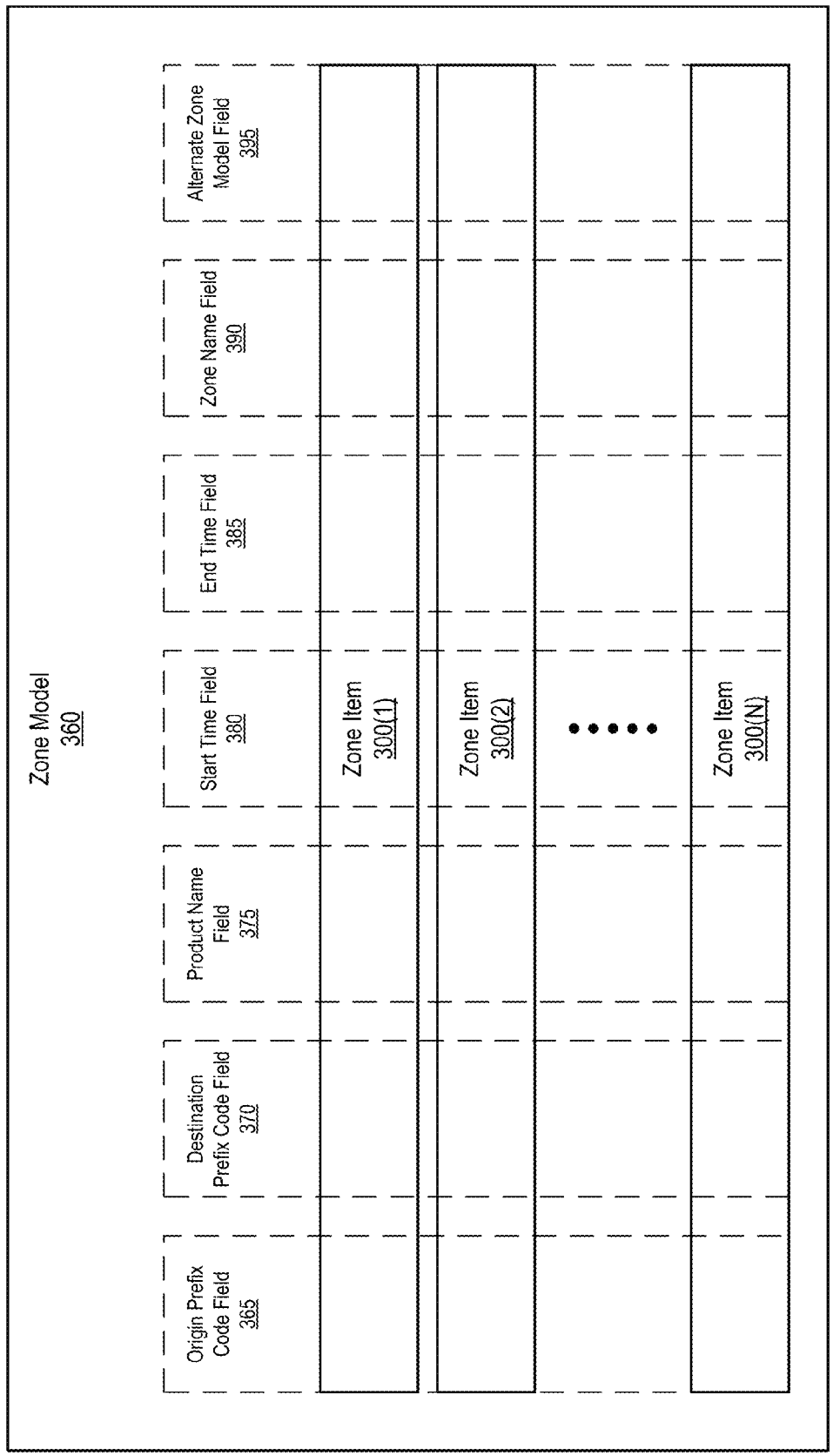
FIG. 3B is a simplified block diagram illustrating an example zone model format, according to one embodiment.

FIG. 3B is a simplified block diagram illustrating an example zone model format (depicted in FIG. 3B as a zone model 360). Zone model 360 includes one or more zone items 300(1)-(N), where each of zone items 300(1)-(N) includes an origin prefix code field 365, a destination prefix code field 370, a product name field 375, a start time field 380 (optional), an end time field 385 (optional), and a zone name field 390. Each of zone items 300(1)-(N) can optionally include a start time and an end time in order to define, for example, a validity period. As depicted in FIG. 3B, an alternate zone model field 395 can, optionally, also be included in each of zone items 300(1)-(N).

Zone models are used to determine charges for service usage based on the origin prefix code and destination prefix code. Among other arrangements possible using the techniques described herein, systems according to the examples described herein include two types of zone models: a standard zone model and a geographic zone model. As will be appreciated from the present disclosure, however, alternative embodiments exist, including a combination of the aforementioned approaches.

A standard zone model is based on the combination of the origin and destination prefix codes. A standard zone model includes rules that associate a pair of origin and destination prefix codes with a zone name (which in turn is associated with a charging plan and/or product rates).

A geographic zone model can be based, for example, on the distance between the origin and destination prefix codes. Such a geographic zone model includes rules that associate a distance with a zone name and a list of prefix codes that are each associated with one or more pairs of longitude and latitude coordinates. When a usage request is received, zone analysis module computes the distance between the geographic points represented by the origin and destination prefix codes. The zone analysis module then identifies the zone item representing the distance that most closely matches the computed distance. The zone associated with the closest-matching zone item is returned as the zone result. Geographic zone models are useful for customers that are located close to the border between two areas (e.g., a destination that is two blocks away, but is still in a different zone that normally mandates long distance charging), or for customers in a single, large area having several rates associated therewith (e.g., associating different pairs of latitude and longitude coordinates with the single area).

Figure 4:
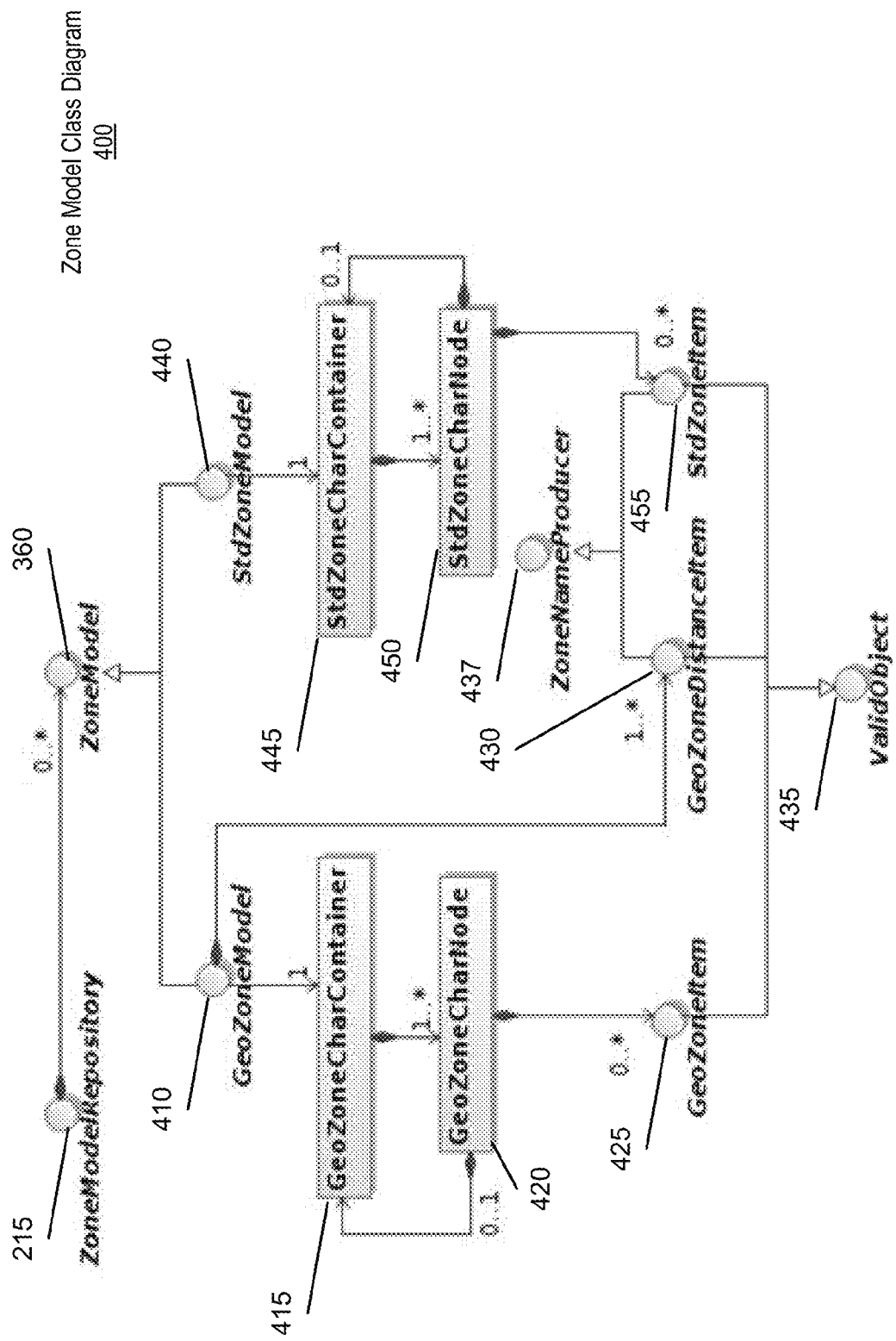
FIG. 4 is a simplified block diagram illustrating components of an example zone model class diagram, according to one embodiment.

FIG. 4 is a simplified block diagram illustrating components of an example zone model class diagram (depicted in FIG. 4 as a zone model class diagram 400). Zone model class diagram 400 illustrates the relationships among various object constructs used to implement a zone model. Zone model repository 215 stores zero or more zone models (such as, e.g., zone model 360 of FIG. 3B). In the example depicted in FIG. 4, a zone model class diagram such as zone model class diagram 400 can be either a geographic zone model 410 or a standard zone model 440. Geographic zone model 410 includes a character container construct 415. Character container construct 415 includes (contains) one or more character node constructs 420. Character node construct 420, in turn, can include zero or more character container constructs 415. Character nodes 420 can also (alternatively) include zero or more geographical zone items 425.

Geographic zone model 410 also includes one or more distance items 430, which are associated with geographical zone items 425. For geographic zone model 410, valid object 435 includes a zone result (or zone name) that is extracted from a zone item that is associated with a distance item (containing a distance value) that is closest to a computed distance for a usage request. Zone name producer 437 returns valid object 435 in response to a lookup zone request.

Standard zone model 440 includes a character container construct 445. Character container construct 445 includes (contains) one or more character node constructs 450. Each of character node constructs 450, in turn, can include zero or more character container constructs 445. Character node constructs 450 can also (alternatively) include zero or more standard zone items 455. For standard zone model 410, valid object 435 includes a zone result (or zone name) that is extracted from a zone item that is associated with a product and/or time stamp that matches the product and/or time stamp extracted from a usage request. Zone name producer 437 returns valid object 435 in response to a lookup zone request.

As can be seen in FIG. 4, then, zone model 360 is depicted as containing a tree of character container constructs 445. Each of character container constructs 445, in turn, includes multiple character node constructs (character node constructs 450), each of which represent a single character that can be matched. Each of character node constructs 450, in turn, includes references to origin-based and destination-based character container constructs 445. In certain embodiments, a configurable zone model tree structure according to the present disclosure is parsed, for example, by performing a best-case partial match on the origin prefix code in question, then traversing to the pertinent destination container(s) to complete the best-case character match of the destination prefix code. Finally, the associated ones of standard zone items 455 are obtained and the one which matches the time-based validity and product type is returned. In certain situations, the standard zone item in question redirects to an entirely different standard zone model, thereby providing for alternate zone model support. Zone model repository 215 facilitates the lookup of zone items and handles any alternate zone model traversing that may be needed. As noted, comparable logic provides for the handling of geographical zone models, which have the ability produce a zone result based on, for example, a geographical distance between the origin and destination prefix codes.

Thus, a (geographic or standard) zone model includes at least one (e.g., first tier) character container that includes one or more character nodes. In certain embodiments, a character node construct represents a single character that can be matched with a prefix code combination. A geographic character node identifies either a next character container that in turn includes one or more character nodes (e.g., traversing the character nodes according to a prefix code combination) or a zone item (e.g., locating the resulting zone item associated with the prefix code combination) (e.g., by including a pointer to the next character container or the zone item). Character containers can be origin-based or destination-based, indicating that an origin prefix code is used to traverse origin-based character containers and a destination prefix code is used to traverse destination-based character containers.

FIG. 5A is a simplified block diagram illustrating components of an example zone model. BAY_AREA zone model 510 is defined by an administrator using zone item editor 205. Zone model builder 210 operates on the zone items provided by the administrator to build a tree structure, as partially illustrated in FIG. 6A. FIG. 7A is a simplified block diagram illustrating components of an example zone analysis process, using the tree structure illustrated in FIG. 6A.

As illustrated in FIG. 5A, BAY_AREA zone model 510 includes zone items 515(1)-(N). Each of zone items 515(1)-(N) includes origin prefix code 310, destination prefix code 320, product name 330, and zone name 350. For example, zone item 515(1) indicates that service usage involving a VOICE product, originating in the 408 prefix code and destined for the 408 prefix code, should be charged using zone Local-SJ (indicating that the service usage remained within the same (local) prefix code). Zone item 515(5) indicates that service usage involving a DATA product, originating in abc prefix code and destined for xyz prefix code, should be charged using zone SHORT.

Figure 6A:
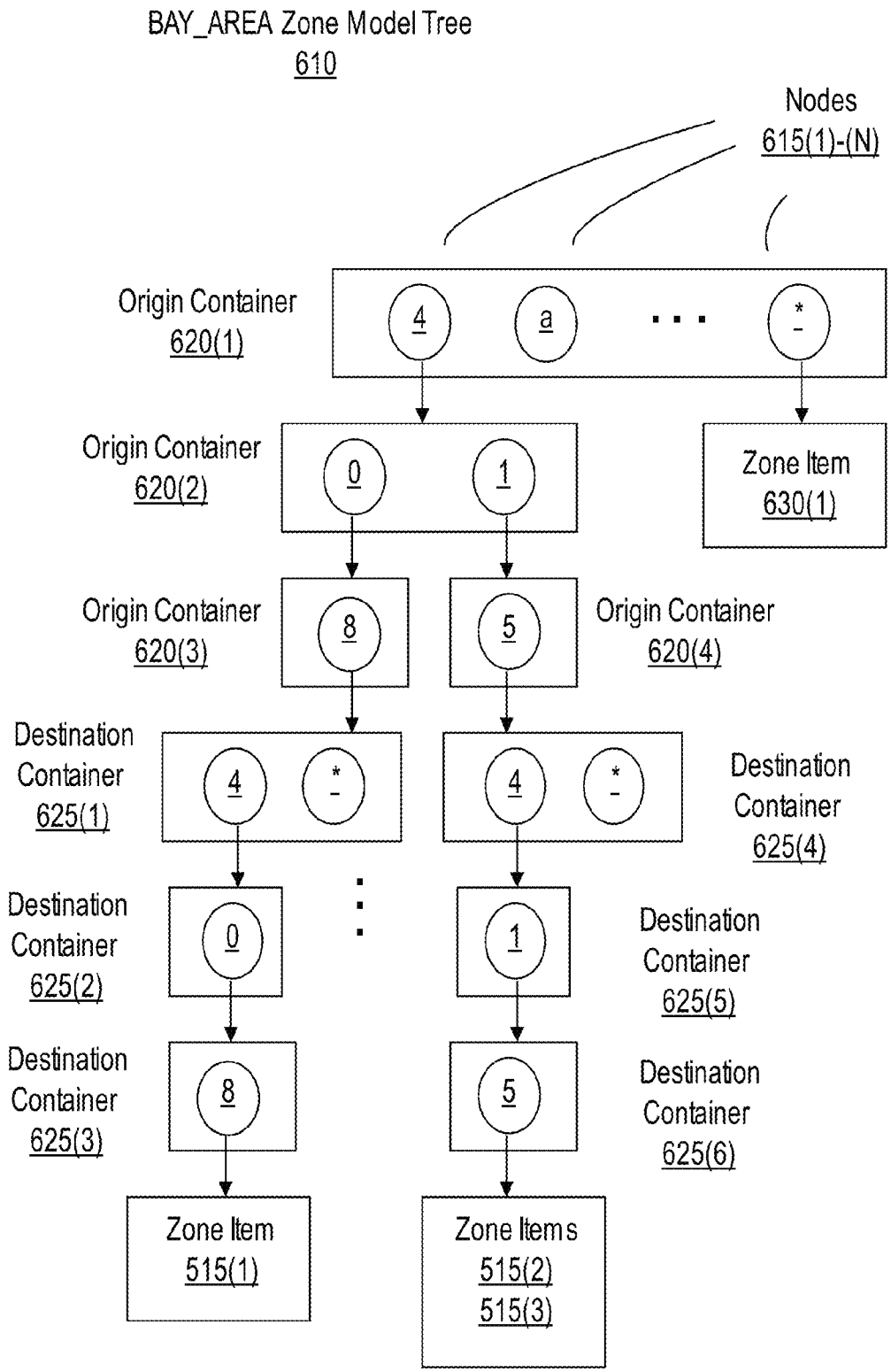
FIGS. 6A, 6B, and 6C are simplified block diagrams illustrating components of example zone model tree structures, according to one embodiment.

As illustrated in FIG. 6A, BAY_AREA zone model tree 610 includes origin containers 620(1)-(N), destination containers 625(1)-(N), and nodes 615(1)-(N). Origin container 620(1) includes nodes representing 4, a, and a wild-card character (* or asterisk), as well as other alphanumerical characters not shown. A wild-card character is a catch-all character and represents any characters that are not explicitly represented by a node in the container. Each node (including nodes that represent a wild-card character) identifies (e.g., points to) either a container or to stored zone items. Thus, rather than searching for each origin and destination prefix code by linearly searching a list of such information, lookup module 230 can traverse the nodes of BAY_AREA zone model tree 610 according to the origin and destination prefix code combination, and thus quickly and efficiently find zone items associated with the given origin and destination prefix code combination. For example, the zone model tree structure indicates that service usage involving an origin/destination prefix code combination of 408-408 is associated with candidate zone item 515(1), or Local-SJ. If the service usage involved VOICE product, Local-SJ would be returned as the zone result. In the case of a wild-card character, prefix code elements not matching explicitly-defined values (e.g., the value "4" in destination container 625(1)) can be "defaulted" (i.e., in the manner of a "catch-all") through the use of a wild-card character (e.g., the value "*" in destination container 625(1)). Further, as noted elsewhere herein, such wild-card characters can be employed to optimize the traversal process by allowing, for example, multiple character values to be aggregated into a single path (or at least, nexus point), thereby obviating the need to traverse further in the given zone model tree. As will be appreciated in light of the present disclosure, such wild-card characters can be used throughout a given zone model tree, to allow the tree to branch where necessary or desired, but to collapse where common treatment of prefix codes is sensible (e.g., prevents redundancy, provides for comparable treatment, and so on).

Further, it will be appreciated that the structure of BAY_AREA zone model tree 610 (as well as others of the configurable zone model tree structures depicted and/or discussed herein) is depicted and discussed as starting at its highest level at the origin container in question, with nodes representing elements in the various origin prefixes maintained in various branches of the tree structure of BAY_AREA zone model tree 610 in order from first to last, followed by destination containers and nodes for the destination prefixes, in comparable fashion, leading to their respective zone item(s). While depicted and discussed in this manner, it should be appreciated that such structuring and ordering are presented merely as examples, and only serve as vehicles for the description of the general nature of and approaches using such structures, and that other tree structures (both configurable and/or fixed in various regards) are envisioned and within the scope of the present disclosure. For example, embodiments of such configurable zone model tree structures can be structured so as to present elements of their respective origin and destination prefix codes in the order of last element to first element, when traversing down the configurable zone model tree structure in question. Other alternatives and modification will be appreciated by one of skill in the art, in light of the present disclosure.

As illustrated in FIG. 7A, several example zone lookup requests 715(1)-(N) are performed by a lookup module such as lookup module 230 of FIG. 2, with associated zone results 750(1)-(N) shown. Lookup module 230 performs a zone lookup request 715 in response to receiving message attributes from a message attribute extractor such as message attribute extractor 225 of FIG. 2, where the message attributes have been extracted from the usage request message received. For each request 715, lookup module reads (e.g., sequentially) at least one digit of an extracted origin prefix code (e.g., from left to right) and determines whether the tree includes a matching node. If so, the lookup module traverses to a container identified by the matching node. This process repeats until the lookup module has completed traversing the tree according to the origin prefix code. Lookup module then sequentially reads at least one digit of an extracted destination prefix code and determines whether the tree includes a matching node. If so, the lookup module traverses to a container identified by the matching node or to a location that stores one or more candidate zone items. The lookup module completes the zone analysis by selecting a zone item that is associated with the extracted product and/or is associated with a validity period within which the extracted time stamp falls (e.g., the extracted time stamp falls between the start time and end time). The zone of the selected zone item is returned as zone result 750.

FIG. 5B is a simplified block diagram illustrating components of an example zone model (depicted in FIG. 5B as a BAY_AREA zone model 520), which is defined by an administrator using, for example, zone item editor 205. Zone model builder 210 operates on the zone items provided by the administrator to build a tree structure, as partially illustrated in FIG. 6B. FIG. 7B is a simplified block diagram illustrating components of an example zone analysis process, using the tree structure illustrated in FIG. 6B.

As illustrated in FIG. 5B, BAY_AREA zone model 520 includes zone items 525(1)-(N). Each zone item 525 includes origin prefix code 310, destination prefix code 320, product name 330, start time 340, end time 345, and zone name 350. For example, zone item 525(1) indicates that service usage involving a VOICE product that originated in the 408 prefix code and is destined for the 408 prefix code and is associated with a time stamp that falls within the period defined by a start time of Jan. 1, 2012, through an end time of Jun. 30, 2012, is charged using zone Local-SJ. If the time stamp falls outside of this period (e.g., Jul. 1, 2012), the service usage is charged using zone Local of zone item 525(2). As illustrated, one or more zone items 525 can be associated with a single zone (e.g., zone Local is associated with zone items 525(2), 525(4), and 525(6)).

Figure 6B:
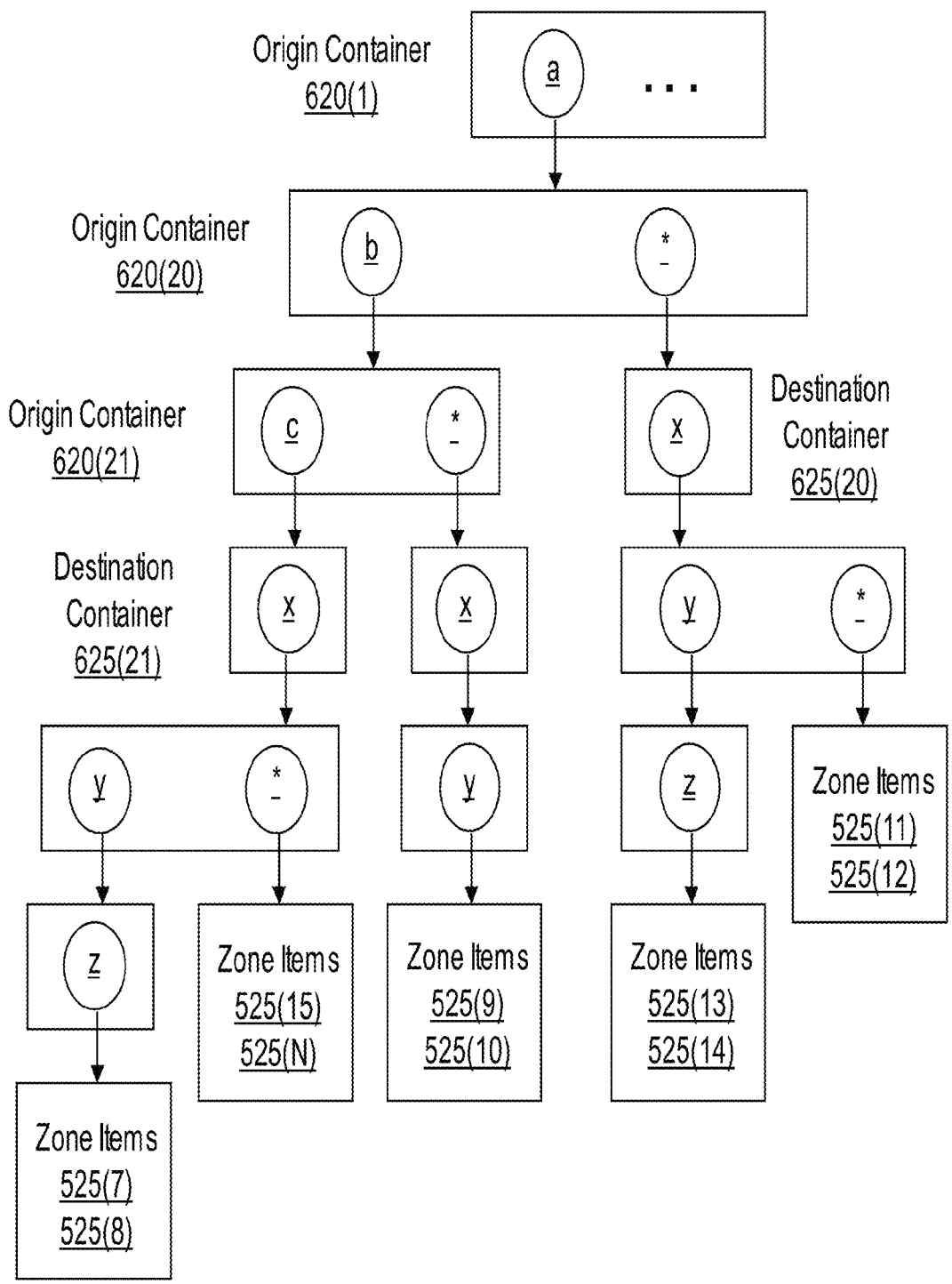

As illustrated in FIG. 6B, a BAY_AREA zone model tree 640 includes origin containers 620(1)-(N), destination containers 625(1)-(N), and nodes 615(1)-(N). Wild-card characters, such as those shown, are especially helpful when defining broad zone categories that cover a large number of zones (e.g., all zones starting with a particular alphanumeric character), while allowing specific zone categories to be carved out as needed. For example, all prefix codes starting with a digit of "letter a" that do not have a second digit of "letter b" are directed to destination container 625(20), as per the wild-card node of origin container 620(20). As illustrated in FIG. 7B, several example zone lookup requests 725(1)-(12) are performed by lookup module 230, with associated zone results 755(1)-(12), as shown.

FIG. 5C is a simplified block diagram illustrating components of an example zone model (depicted in FIG. 5C as a BAY_AREA zone model 530), which is defined by an administrator using zone item editor 205. Zone model builder 210 operates on the zone items provided by the administrator to build a tree structure, as partially illustrated in FIG. 6C. FIG. 7C is a simplified block diagram illustrating components of an example zone analysis process, using the tree structure illustrated in FIG. 6C.

As illustrated in FIG. 5C, a BAY_AREA zone model 530 includes zone items 535(1)-(N). Each zone item includes origin prefix code 310, destination prefix code 320, product name 330, zone name 350, and alternate zone model 355. Alternate zone model 355 identifies a distinct zone model. During zone analysis, alternate zone model 355 redirects the traversal to the zone tree of alternate zone model 355. Zone item 535(3) includes zone International and alternate zone model ITALY, which, in turn, identifies an ITALY zone model 540. ITALY zone model 540 includes zone items 545(1)-(N), which in turn include origin prefix code 310, destination prefix code 320, product 330, zone name 350, and alternate zone model 355. Zone item 545(1) includes an alternate zone model SICILY, which, in turn, identifies a SICILY zone model 550. SICILY zone model 550 includes zone items 555(1)-(N), which in turn include origin prefix code 310, destination prefix code 320, product 330, zone name 350, and alternate zone model 355.

Figure 6C:
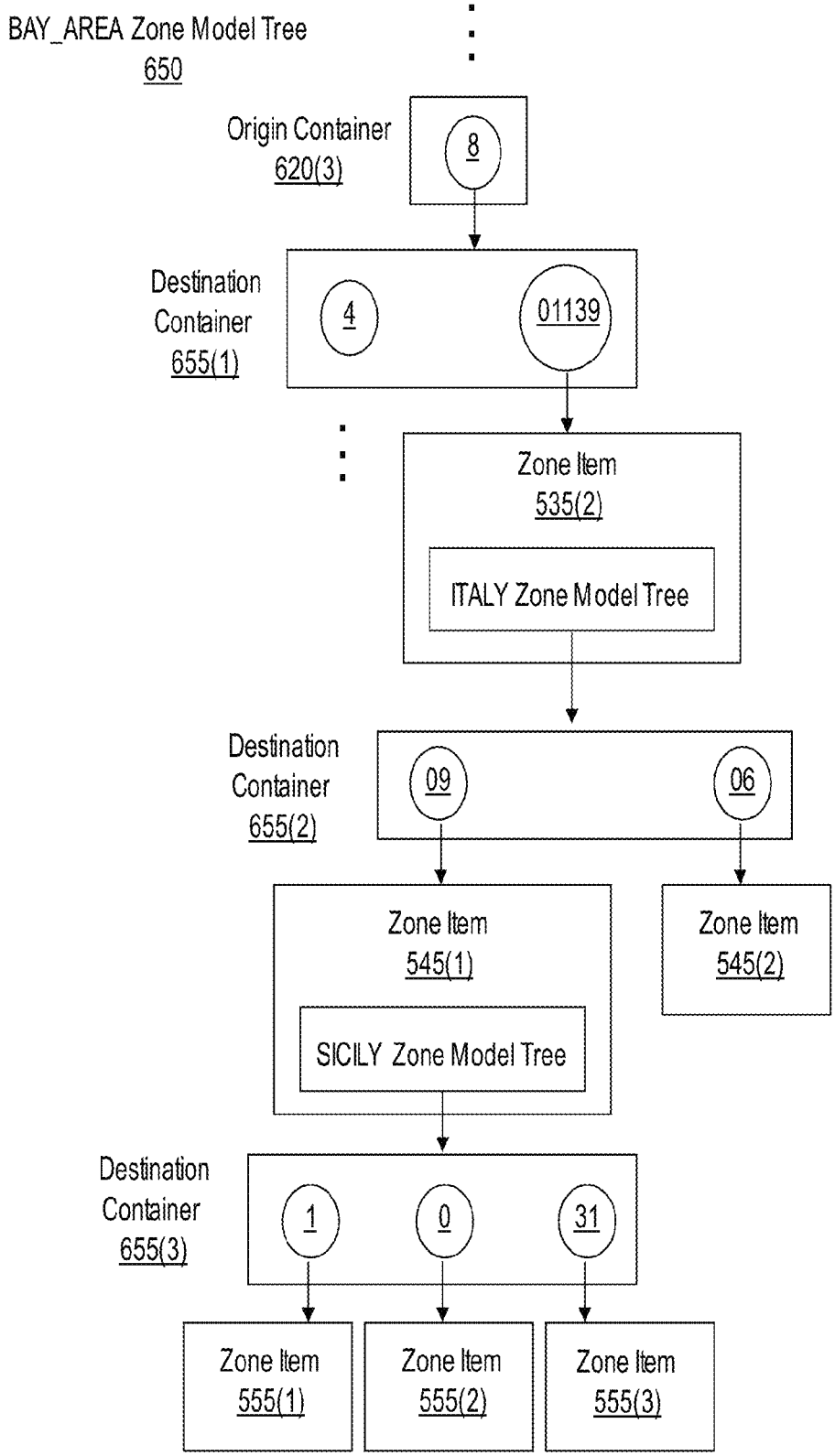

As illustrated in FIG. 6C, a BAY_AREA zone model tree 650 includes origin containers 620(1)-(N), destination containers 625(1)-(N) (as seen in BAY_AREA zone model tree 640), destination containers 655(1)-(N), and nodes 615(1)-(N). Destination container 655(1) is shown to include a node representing 01139. In one embodiment, such a node is representative of a number of nodes that each represent a digit of the international prefix code 01139. Zone item 535(2) includes a reference to ITALY zone model tree. In one embodiment, the reference to ITALY zone model tree points to a destination container (a destination container 655(2)) in the ITALY zone model tree. In another embodiment, the reference to ITALY zone model tree points to a first tier origin container of the ITALY zone model tree, in which the nodes matching the international prefix code are traversed to destination container 655(2). Similarly, destination container 655(2) includes a node representing digits 09. In one embodiment, such a node is representative of two nodes, for zero and for nine. The associated zone item 545(1) includes a reference to SICILY zone model tree. In one embodiment, the reference to SICILY zone model tree points to a destination container 655(3) in the SICILY zone model tree. In another embodiment, the reference to SICILY zone model tree points to a first tier origin container of the SICILY zone model tree, in which the nodes matching the international prefix code are traversed to destination container 655(3). As illustrated in FIG. 7C, several example zone lookup requests 735(1)-(N) are performed by lookup module 230, with associated zone results 760(1)-(N) shown.

Figure 8:
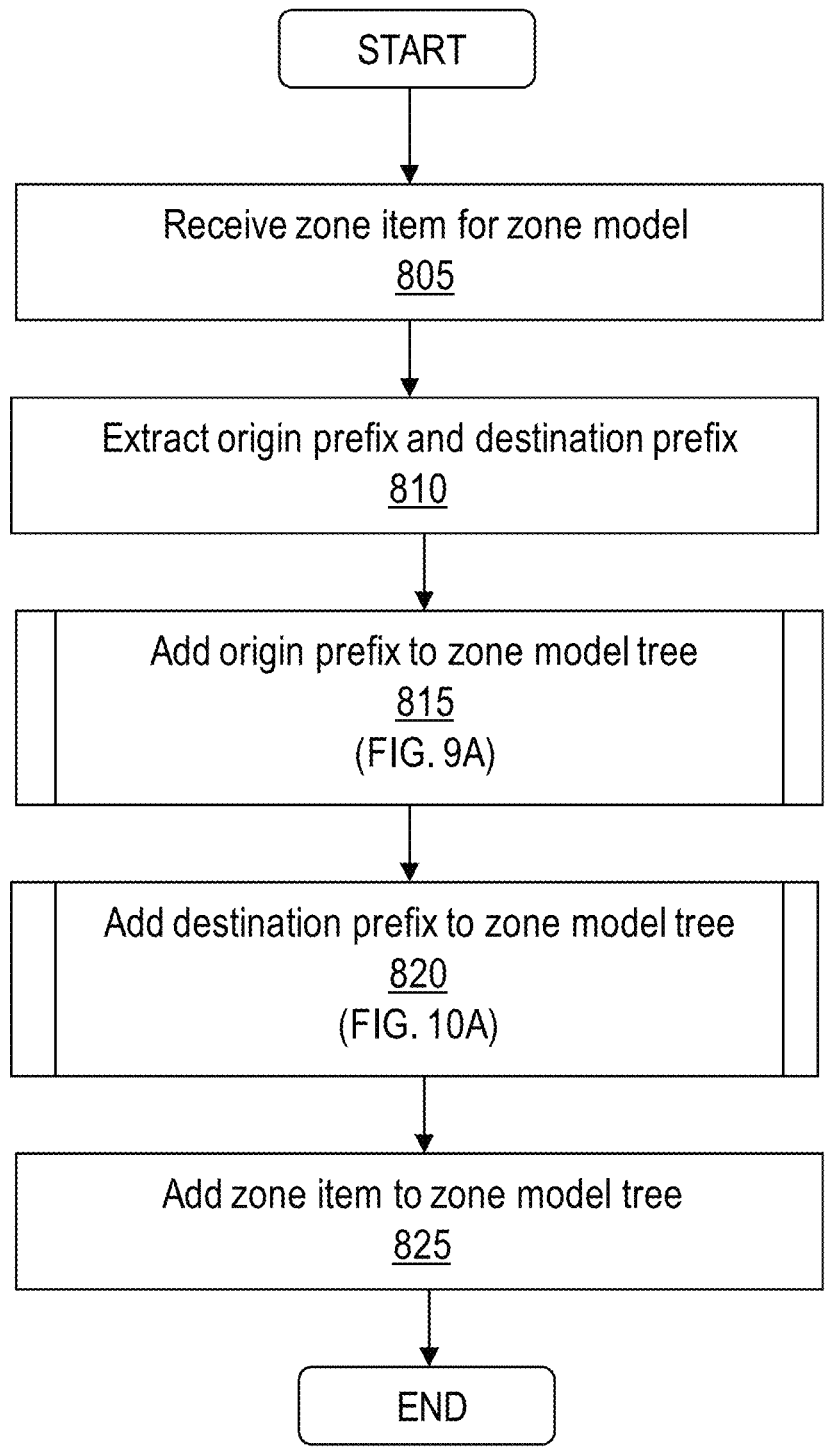
FIG. 8 is a flowchart illustrating an example zone model tree structure generation process, according to one embodiment.

FIG. 8 is a flowchart illustrating an example zone model tree structure generation process implemented by a zone model builder of a zone analysis module (e.g., zone model builder 210 of zone analysis module 140 in FIG. 2). The process illustrated in FIG. 8 starts at operation 805, where a zone item, to be used in the generation of a zone model, is received. Zone items are defined using a zone item editor (such as zone item editor 205 of FIG. 2), and are provided to the zone model builder. The process continues to operation 810, where the zone model builder extracts an origin prefix code and a destination prefix code from the zone item. The process continues to operation 815, where the zone model builder adds the origin prefix code to a zone model tree. The zone model builder may build a new zone model tree or update an existing zone model tree, according to the zone items processed by the zone model builder. Operation 815 is further discussed below in connection with FIG. 9A.

The process continues to operation 820, where the zone model builder adds the destination prefix to the zone model tree. Operation 820 is further discussed below in connection with FIG. 10A. The process continues to operation 825, where the zone model builder adds the zone item to the zone model tree. Thus, an origin prefix code and a destination prefix code are keys that can be used to find the zone item associated therewith. This portion of the zone model tree structure now generated, the process concludes.

Figure 9A:
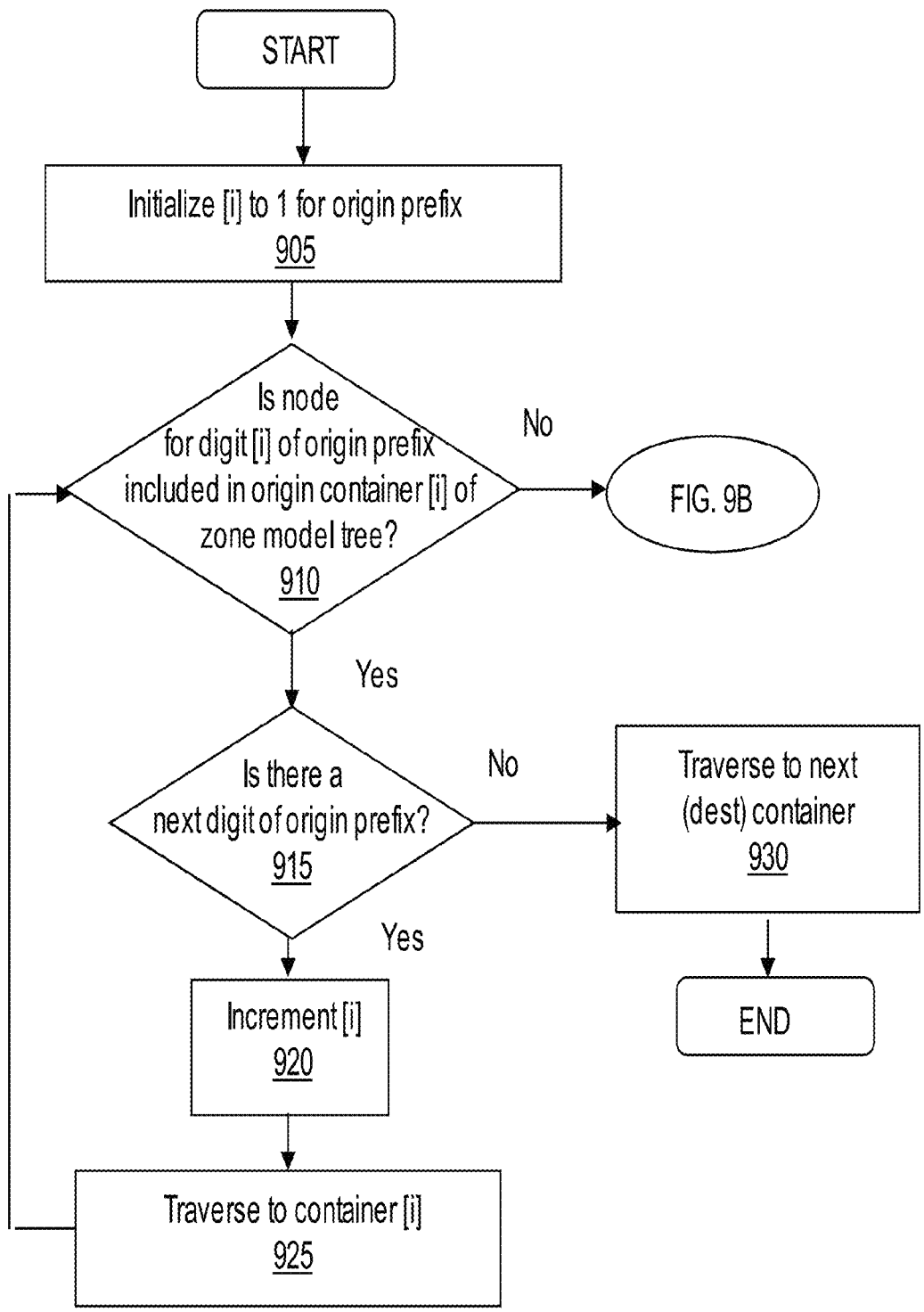
FIGS. 9A and 9B are flowcharts illustrating an example origin prefix addition process, according to one embodiment.
Figure 9B:
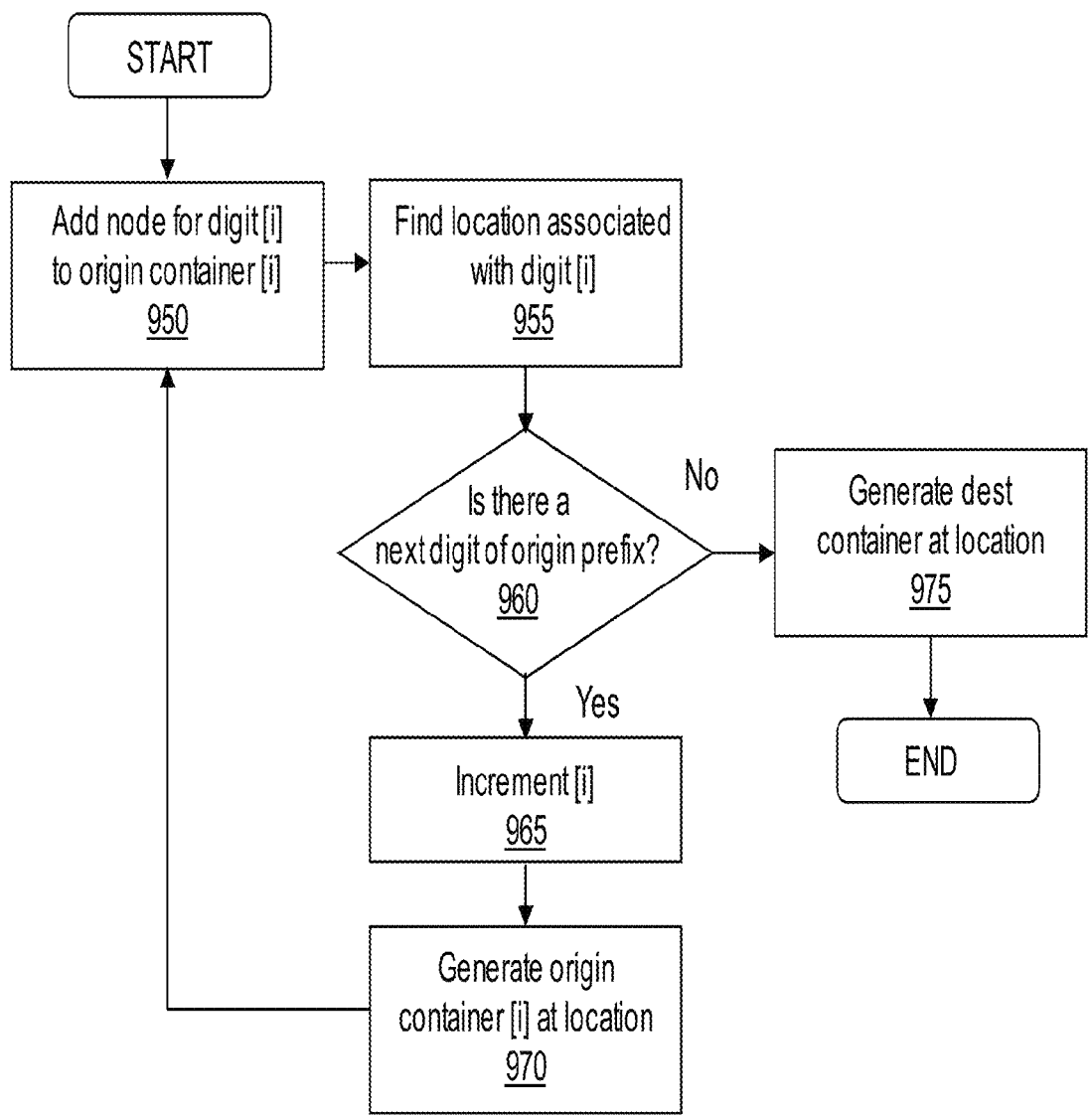

FIGS. 9A and 9B are flowcharts illustrating an example process for addition of an origin prefix to a configurable zone model tree structure, according to embodiments of processes such as those described herein. The process illustrated in FIG. 9A begins, at operation 905, where the index ([i]) is initialized to 1 for the origin prefix. Once the initialization operation is complete, a determination is made as to whether the node for digit[i] of the origin prefix is included in the origin container of the zone model tree in question (origin container[i]), at operation 910. If the node for digit[i] of the origin prefix is included in origin container[i], a determination is then made as to whether there is a next digit of the origin prefix to be examined (operation 915). If there is a next digit of the origin prefix to be examined, the index is incremented at operation 920. At operation 925, the process traverses to the appropriate origin container (container[i]). Having traversed to the appropriate container, the process loops back to the determination with regard to the inclusion of the now-current node for the now-current digit of the origin prefix in the respective origin container. Alternatively, at operation 915, if a determination is made that the digits of the origin prefix have been examined (and thus, no further digits of the origin prefix need be examined), the process traverses to the next container (destination container), at operation 930. Upon traversing to the next (destination) container, the process concludes.

In the case in which the node for digit[i] of the origin prefix is not included in the origin container in question (origin container[i]) of the zone model tree (operation 910), the process proceeds to FIG. 9B. The process illustrated in FIG. 9B begins, at operation 950, with the addition of a node for digit[i] to the appropriate origin container (origin container [i]) in the configurable zone model tree structure. At operation 955, the location in the configurable zone model tree structure associated with digit[i] is determined. Once this determination is made, a determination is made, at operation 960, as to whether there is a next digit in the origin prefix. In the case in which there is no next digit of the origin prefix (all digits of the origin prefix have been examined), the destination container is generated at the location (operation 975). Once the destination container has been generated at the proper location in the configurable zone model tree structure, the process concludes.

Alternatively, if there is a next digit of the origin prefix, the index is incremented (operation 965). Next, origin container [i] is generated at the location at operation 970. The process illustrated in FIG. 9B then loops to operation 950, at which point the node for digit[i] is added to the appropriate origin container (origin container[i]). Ultimately, as illustrated in FIG. 9B, the process concludes.

Figure 10A:
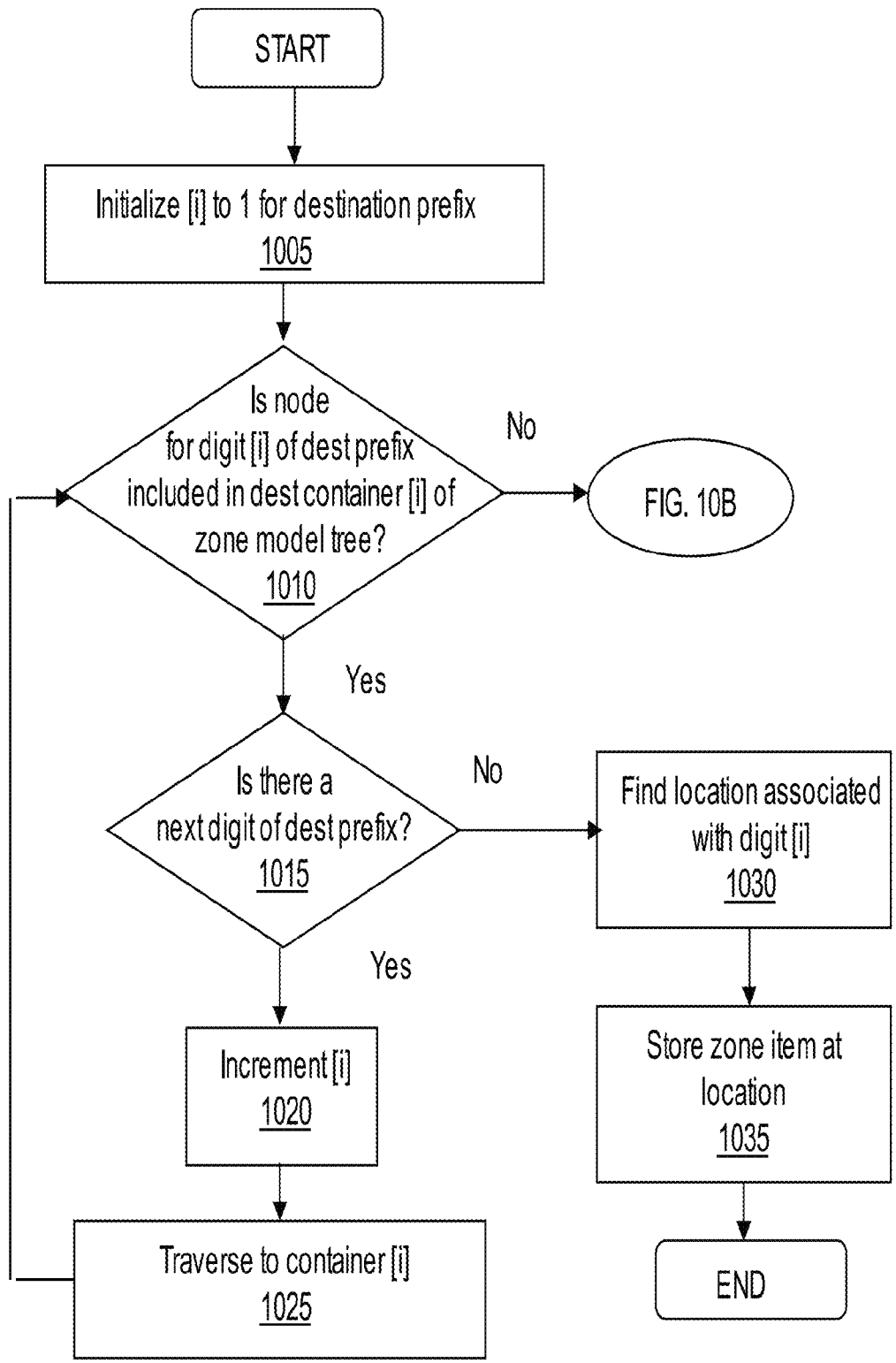
FIGS. 10A and 10B are flowcharts illustrating an example destination prefix addition process, according to one embodiment.
Figure 10B:
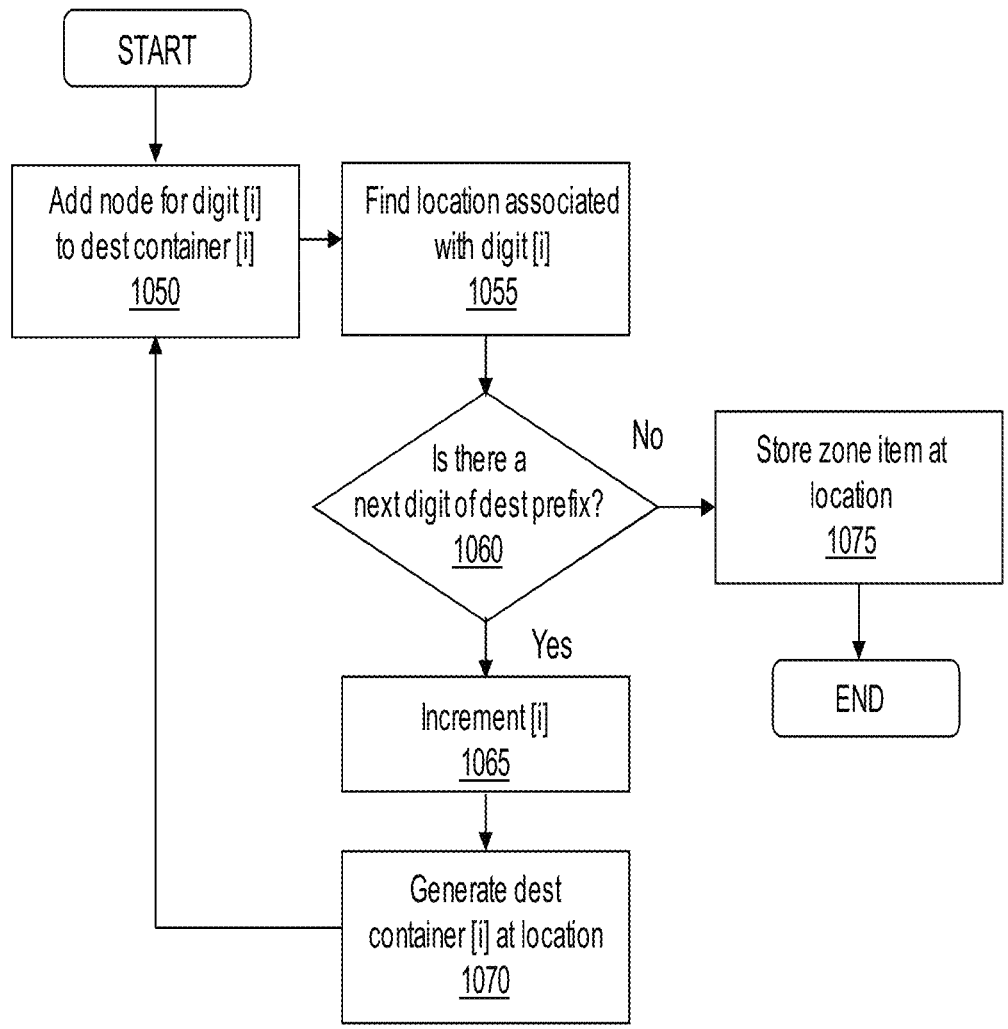

FIGS. 10A and 10B are flowcharts illustrating an example of the addition of a destination prefix to a configurable zone model tree structure, according to embodiments of processes such as those described herein. The process illustrated in FIG. 10A begins, at operation 1005, with the initialization of the index ([i]) to 1 for the destination prefix. At operation 1010, a determination is then made as to whether the node for digit[i] of the destination prefix is included in the destination container (destination container[i]) of the zone model tree. If the node for digit[i] of the destination prefix is included in the destination container of the zone model tree, a determination is made as to whether there is a next digit of the destination prefix at operation 1015. In the case in which there is a next digit in the destination prefix, the index in incremented (operation 1020) and the process traverses to the container indicated thereby (container[i]) at operation 1025. The process then loops back to the aforementioned determination (as to whether this digit of the destination prefix is included in the corresponding destination container of the zone model tree), at step 1010. The process continues in this manner Once the destination prefix has been examined, and no next digit of the destination prefix remains to be examined, the process proceeds to operation 1030, where a location in the configurable zone model tree structure, associated with digit[i], is found. The zone item in question is then stored at the given location in the configurable zone model tree structure, at operation 1035. Having performed the foregoing operations, the process of adding the destination prefix to the configurable zone model tree structure concludes.

Alternatively, if the node for digit[i] of the destination prefix is not included in the destination container in question (destination container[i]) of the zone model tree (operation 1010), the process proceeds to the process illustrated in FIG. 10B. The process of FIG. 10B begins, at operation 1050, with the addition of a node for the digit in question (digit[i]) to the appropriate destination container (destination container[i]). Next, at operation 1055, a location in the configurable zone model tree structure, associated with digit[i], is found. A determination is then made as to whether there is a next digit of the destination prefix at operation 1060. In the case in which a next digit of the destination prefix is thus identified, the index is incremented at operation 1065, and destination container[i] is generated at the appropriate location in the configurable zone model tree structure (operation 1070). The process then loops back to operation 1050, where the node for digit[i] (i.e., the node for the next digit) is added to destination container[i] (operation 1050). The process continues in this manner until such time as a determination is made that there is no next digit of destination prefix remains to be examined, at which time the zone item in question is stored at the proper location in the configurable zone model tree structure (operation 1075). The zone item having been stored, the process of adding the destination prefix to the configurable zone model tree structure concludes.

Figure 11:
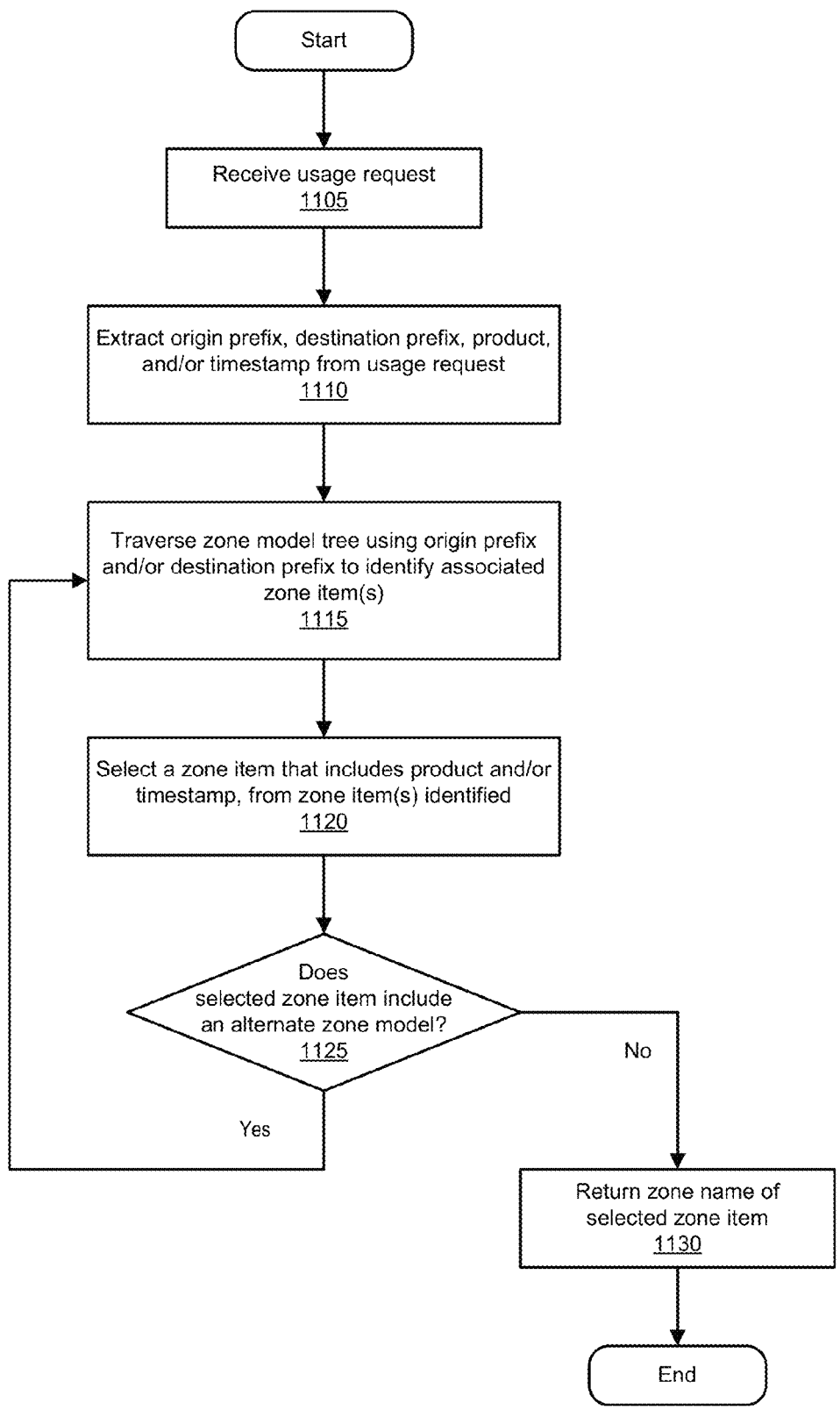
FIG. 11 is a flowchart illustrating an example zone model analysis process, according to one embodiment.

FIG. 11 is a flowchart illustrating an example zone model analysis process, according to concepts and systems such as those described herein, in which one or more zone items are returned in response to the receipt of a service usage request. The process of FIG. 11 begins at operation 1105, with the receipt of a service usage request. Next, an origin prefix, a destination prefix, a product name, and/or timestamp information, among other possible alternatives, are extracted from the usage request thus received (operation 1110).

Once the requisite information has been extracted from the usage request, the zone model tree is traversed using the origin prefix code and/or the destination prefix code, in order to locate zone item(s) associated with the given codes (operation 1115). As will be appreciated from the present disclosure, traversal of the zone model tree proceeds by comparing elements of the origin prefix code and destination prefix code with information regarding prefix code elements represented by nodes in the zone model tree, according to one embodiment. As the nodes in the zone model tree are traversed, a zone analysis module according to the embodiments described herein (and more specifically, a lookup module thereof) compares an element in the origin (or destination) prefix code with the element represented by the respective node in the zone model tree, thereby traversing the appropriate path through the nodes and containers of the zone model tree in this fashion. To this end (and as noted earlier herein), certain embodiments of a zone model tree structure according to the present disclosure permit traversal of such a structure to a particular depth in an optimized fashion. Features such as wild-cards permit such a configurable zone model to effect such optimized traversal by supporting partial (or even total) wild-card matching, allowing the desired information to be found quickly and efficiently. This can be accomplished, for example, in the manner described in connection with FIGS. 6A and 6B. As also noted, using such configurable zone models, systems according to the present disclosure allow service providers to implement support for zoning in their services in a flexible and efficient manner, and to do so without negatively impacting overall charging request latencies, important factors in meeting (often strict) real-time latency requirements that certain applications mandate. In any event, once the zone model tree has been traversed, the lookup module of the zone analysis module identifies one or more zone items for the combination of prefix codes (e.g., origin and destination prefix code combination).

Having traversed the zone model tree and identified one or more zone items thusly, the lookup module (or comparable construct) selects a zone item from the zone item(s) thus identified, such that the selected zone item includes, for example, the requisite product name and/or timestamp information (operation 1120). As will be appreciated in light of the present disclosure, product name information and timestamp information are employed merely as examples of information that can be used to select the appropriate zone item from the zone item(s) thus identified. Other information, including proprietary codes, other characteristics, and the like, can be used to good effect in this regard, and thus are considered to be within the scope of the present disclosure.

At operation 1125, a determination is made as to whether the selected zone item includes an alternate zone model. In the case in which the zone item includes an alternate zone model, the aforementioned operations can be performed with regard to the alternate zone model thus identified. This can be accomplished by having the process loop back to operation 1115 (with the alternate zone model being used) and the requisite zone item selected therefrom, as per operation 1120. Once the requisite traversing, identification, and selection have been performed (including, as described, iterating in the prescribed manner, if necessary), the zone name of the zone item thus identified is returned (operation 1130), thereby providing information for use in identifying the appropriate treatment of the service usage request. The zone name having been returned, the process concludes.

An Example Computing and Network Environment

As shown above, the present invention can be implemented using a variety of computer systems and networks. An example of one such computing and network environment is described below with reference to FIGS. 12 and 13.

Figure 12:
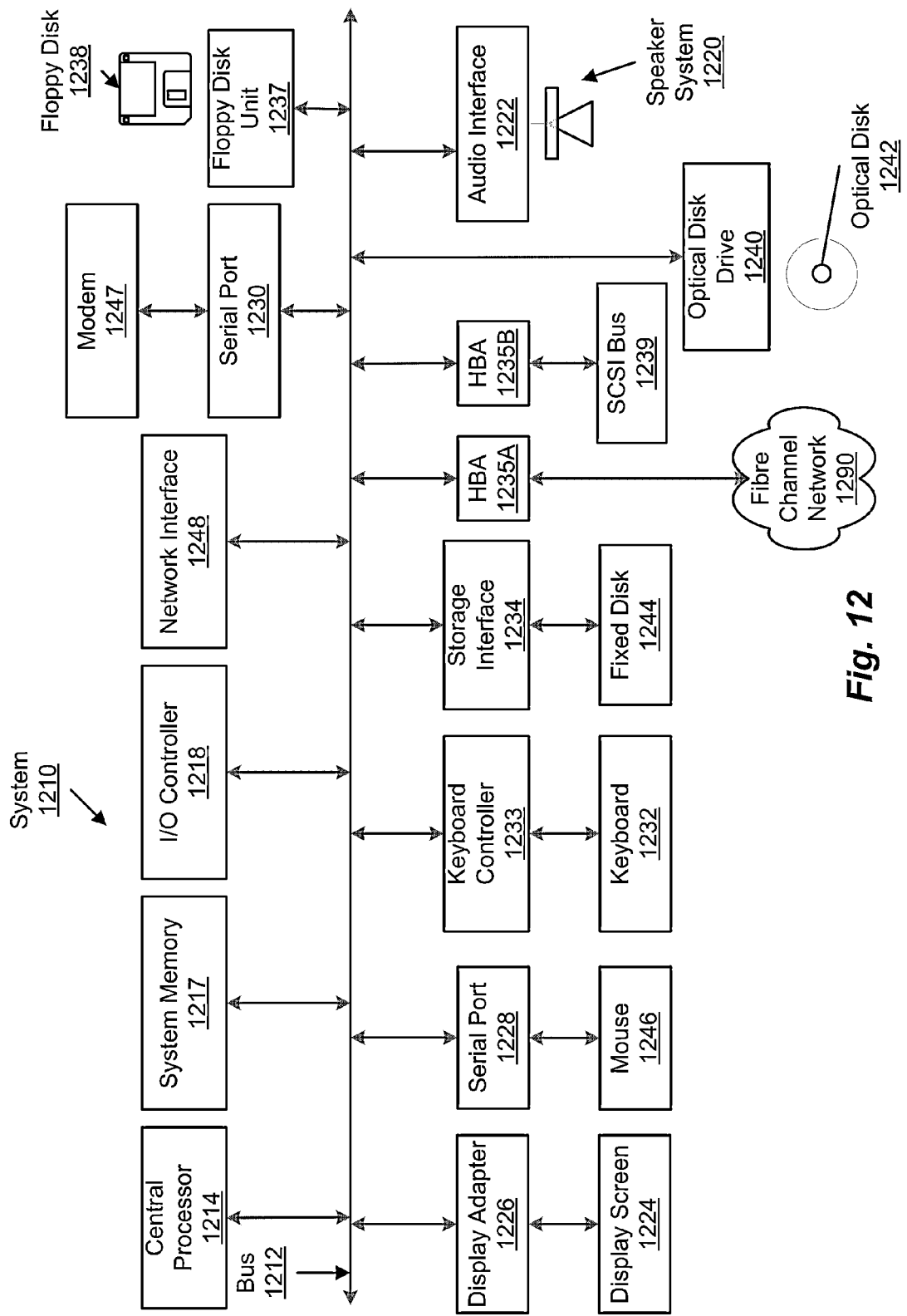
FIG. 12 is a simplified block diagram of a computer system suitable for implementing aspects of the present disclosure, according to one embodiment.

FIG. 12 depicts a block diagram of a computer system 1210 suitable for implementing aspects of the present invention (e.g., for implementing computing devices for implementing various system components, such as user equipment 115, gateway 120, mediation system 125, elastic charging engine 130 and/or external billing/charging engine 135). Computer system 1210 includes a bus 1212 which interconnects major subsystems of computer system 1210, such as a central processor 1214, a system memory 1217 (typically RAM, but which may also include ROM, flash RAM, or the like), an input/output controller 1218, an external audio device, such as a speaker system 1220 via an audio output interface 1222, an external device, such as a display screen 1224 via display adapter 1226, serial ports 1228 and 1230, a keyboard 1232 (interfaced with a keyboard controller 1233), a storage interface 1234, a floppy disk drive 1237 operative to receive a floppy disk 1238, a host bus adapter (HBA) interface card 1235A operative to connect with a Fibre Channel network 1290, a host bus adapter (HBA) interface card 1235B operative to connect to a SCSI bus 1239, and an optical disk drive 1240 operative to receive an optical disk 1242. Also included are a mouse 1246 (or other point-and-click device, coupled to bus 1212 via serial port 1228), a modem 1247 (coupled to bus 1212 via serial port 1230), and a network interface 1248 (coupled directly to bus 1212).

Bus 1212 allows data communication between central processor 1214 and system memory 1217, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 1210 are generally stored on and accessed via a computer-readable medium, such as a hard disk drive (e.g., fixed disk 1244), an optical drive (e.g., optical drive 1240), a floppy disk unit 1237, or other storage medium. Additionally, applications can be in the form of electronic signals modulated in accordance with the application and data communication technology when accessed via network modem 1247 or interface 1248.

Storage interface 1234, as with the other storage interfaces of computer system 1210, can connect to a standard computer-readable medium for storage and/or retrieval of information, such as a fixed disk drive 1244. Fixed disk drive 1244 may be a part of computer system 1210 or may be separate and accessed through other interface systems. Modem 1247 may provide a direct connection to a remote server via a telephone link or to the Internet via an internet service provider (ISP). Network interface 1248 may provide a direct connection to a remote server via a direct network link to the Internet via a POP (point of presence). Network interface 1248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 12 need not be present to practice the present invention. The devices and subsystems can be interconnected in different ways from that shown in FIG. 12. The operation of a computer system such as that shown in FIG. 12 is readily known in the art and is not discussed in detail in this application. Code to implement the present invention can be stored in computer-readable storage media such as one or more of system memory 1217, fixed disk 1244, optical disk 1242, or floppy disk 1238. The operating system provided on computer system 1210 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 13:
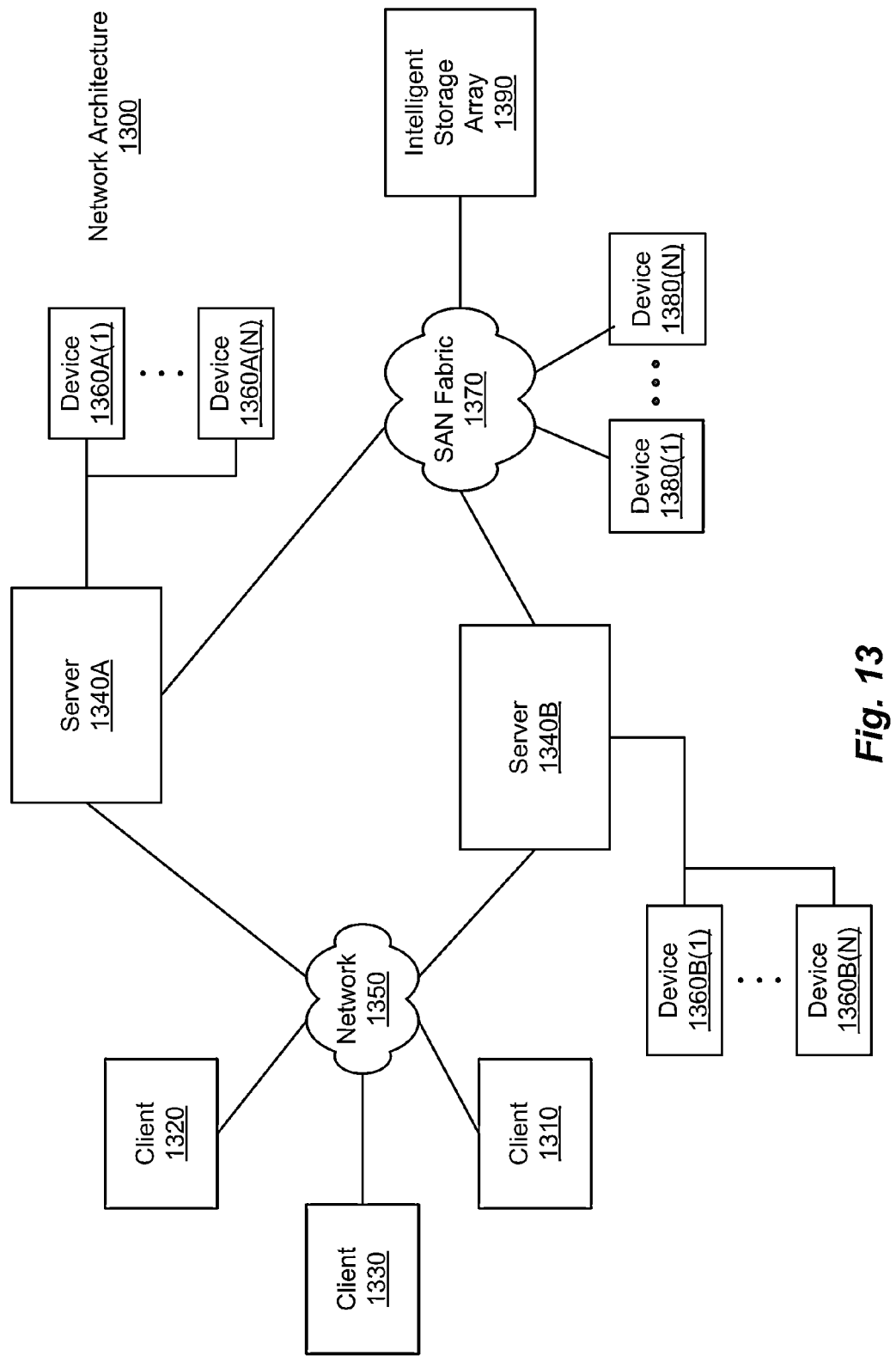
FIG. 13 is a simplified block diagram of a network architecture suitable for implementing aspects of the present disclosure, according to one embodiment.

FIG. 13 is a block diagram depicting a network architecture 1300 in which client systems 1310, 1320 and 1330, as well as storage servers 1340A and 1340B (any of which can be implemented using computer system 1310), are coupled to a network 1350. Storage server 1340A is further depicted as having storage devices 1360A(1)-(N) directly attached, and storage server 1340B is depicted with storage devices 1360B(1)-(N) directly attached. Storage servers 1340A and 1340B are also connected to a SAN fabric 1370, although connection to a storage area network is not required for operation of the invention. SAN fabric 1370 supports access to storage devices 1380(1)-(N) by storage servers 1340A and 1340B, and so by client systems 1310, 1320 and 1330 via network 1350. Intelligent storage array 1390 is also shown as an example of a specific storage device accessible via SAN fabric 1370.

With reference to computer system 1310, modem 1347, network interface 1348 or some other method can be used to provide connectivity from each of client computer systems 1310, 1320 and 1330 to network 1350. Client systems 1310, 1320 and 1330 are able to access information on storage server 1340A or 1340B using, for example, a web browser or other client software (not shown). Such a client allows client systems 1310, 1320 and 1330 to access data hosted by storage server 1340A or 1340B or one of storage devices 1360A(1)-(N), 1360B(1)-(N), 1380(1)-(N) or intelligent storage array 1390. FIG. 13 depicts the use of a network such as the Internet for exchanging data, but the present invention is not limited to the Internet or any particular network-based environment.

Other Embodiments

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing describes embodiments including components contained within other components (e.g., the various elements shown as components of computer system 1210). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof, including the specialized system illustrated in FIG. 1.

The present invention has been described in the context of fully functional computer systems; however, those skilled in the art will appreciate that the present invention is capable of being distributed as a program product in a variety of forms, and that the present invention applies equally regardless of the particular type of computer-readable media used to actually carry out the distribution. Examples of computer-readable media include computer-readable storage media, as well as media storage and distribution systems developed in the future.

The above-discussed embodiments can be implemented by software modules that perform one or more tasks associated with the embodiments. The software modules discussed herein may include script, batch, or other executable files. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment of the invention can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

What is claimed is:

1. A method comprising:
   receiving a service usage request, wherein
      the service usage request represents, at least in part, a request for service usage received from a subscriber,
      the service usage request comprises
         a value pair, and
      the value pair comprises
         a first value, and
         a second value;

identifying a zone item by traversing a configurable zone model tree, wherein
the traversing is performed using
the first value, and
the second value;
identifying a zone name of the zone by determining whether the service usage request occurred during a validity period for an entry in the zone item, wherein the validity period is defined by a start time and an end time specified by the zone item; and
returning the zone name of the zone, wherein
the zone item comprises the zone name, and
the zone name identifies a charging structure to be used in satisfying the service usage request.

2. The method of claim 1, wherein
the first value is an origin prefix code,
the second value is a destination prefix code, and
the traversing is performed using
the origin prefix code, and
the destination prefix code.

3. The method of claim 2, further comprising:
extracting the origin prefix code and the destination prefix code from the service usage request.

4. The method of claim 1, wherein
the zone model tree represents a zone model, and
the zone model is one of
a standard zone model, or
a geographic zone model.

5. The method of claim 1, wherein
the zone model tree comprises a wild-card character.

6. The method of claim 1, wherein the identifying identifies one or more zone items, and the method further comprises:
selecting the zone item from the one or more zone items.

7. The method of claim 6, wherein
the service usage request comprises one or more attributes, and
the selecting the zone item further comprises
selecting the zone item using the one or more attributes.

8. The method of claim 1, wherein the service usage request comprises one or more attributes, and
identifying the zone name
comprises using the one or more attributes.

9. The method of claim 8, wherein
the one or more attributes comprise
product name information, and
the zone name is identified using the product name information.

10. The method of claim 8, wherein
the one or more attributes comprise
time stamp information,
the zone name is identified using the time stamp information, and
the time stamp information identifies a point in time at which the service usage request was made.

11. A computer program product comprising:
a plurality of instructions, comprising
a first set of instructions, executable on a computer system, configured to receive a service usage request, wherein
the service usage request represents, at least in part, a request for service usage received from a subscriber,
the service usage request comprises
a value pair, and
the value pair comprises
a first value, and
a second value,
a second set of instructions, executable on the computer system, configured to identify a zone item by traversing a configurable zone model tree, wherein
the traversing is performed using
the first value, and
the second value,
and to identify a zone name of the zone by determining whether the service usage request occurred during a validity period for an entry in the zone item, wherein the validity period is defined by a start time and an end time specified by the zone item; and
a third set of instructions, executable on the computer system, configured to return the zone name of the zone, wherein
the zone item comprises the zone name, and
the zone name identifies a charging structure to be used in satisfying the service usage request; and
a non-transitory computer-readable storage medium, wherein the instructions are encoded in the non-transitory computer-readable storage medium.

12. The computer program product of claim 11, wherein the second set of instructions are configured to identify one or more zone items, and the instructions further comprise:
a fourth set of instructions, executable on the computer system, configured to select the zone item from the one or more zone items.

13. The computer program product of claim 11, wherein
the service usage request comprises one or more attributes, and
the fourth set of instructions comprises
a first subset of instructions, executable on the computer system, configured to select the zone item using the one or more attributes.

14. The computer program product of claim 11, wherein
the service usage request comprises one or more attributes, and the instructions further comprise:
a fifth set of instructions, executable on the computer system, configured to identify the zone name, wherein
the zone name is identified using the one or more attributes.

15. The computer program product of claim 11, wherein
the first value is an origin prefix code,
the second value is a destination prefix code, and
the second set of instructions are configured to perform the traversing using
the origin prefix code, and
the destination prefix code.

16. The computer program product of claim 11, wherein
the zone model tree represents a zone model, and
the zone model is one of
a standard zone model, or
a geographic zone model.

17. A computer system comprising:
a processor;
a non-transitory computer-readable storage medium coupled to the processor; and
a plurality of instructions, encoded in the non-transitory computer-readable storage medium and configured to cause the processor to
receive a service usage request, wherein
the service usage request represents, at least in part, a request for service usage received from a subscriber,
the service usage request comprises
a value pair, and
the value pair comprises
a first value, and
a second value, identify a zone item by traversing a configurable zone model tree, wherein
the traversing is performed using
the first value, and
the second value,
identify a zone name of the zone by determining whether the service usage request occurred during a validity period for an entry in the zone item, wherein the validity period is defined by a start time and an end time specified by the zone item; and
return a zone name of the zone, wherein
the zone item comprises the zone name, and
the zone name identifies a charging structure to be used in satisfying the service usage request.

18. The computer system of claim 17, wherein
the first value is an origin prefix code,
the second value is a destination prefix code, and
the traversing is performed using
the origin prefix code, and
the destination prefix code.

19. The computer system of claim 17, wherein
the identifying identifies one or more zone items, and
the plurality of instructions are further configured to cause
the processor to select the zone item from the one or more zone items.

20. The computer system of claim 19, wherein
the service usage request comprises one or more attributes, and
the instructions configured to cause the processor to select the zone item further comprise instructions configured to cause the processor to
select the zone item using the one or more attributes.

* * * * *